United States Patent
Hattori et al.

(10) Patent No.: US 10,780,797 B2
(45) Date of Patent: Sep. 22, 2020

(54) PART FIXTURE

(71) Applicant: PIOLAX, INC., Yokohama-shi (JP)

(72) Inventors: Ryu Hattori, Yokohama (JP); Kazuhiro Mita, Yokohama (JP)

(73) Assignee: PIOLAX, INC., Yokohama-Shi, Kanagawa (JP)

( * ) Notice: Subject to any disclaimer, the term of this patent is extended or adjusted under 35 U.S.C. 154(b) by 553 days.

(21) Appl. No.: 15/567,917

(22) PCT Filed: Apr. 19, 2016

(86) PCT No.: PCT/JP2016/062304
§ 371 (c)(1),
(2) Date: Oct. 19, 2017

(87) PCT Pub. No.: WO2016/171110
PCT Pub. Date: Oct. 27, 2016

(65) Prior Publication Data
US 2018/0050610 A1    Feb. 22, 2018

(30) Foreign Application Priority Data

Apr. 20, 2015    (JP) .................................. 2015-085700

(51) Int. Cl.
*B60N 2/015*    (2006.01)
*F16B 21/07*    (2006.01)
(Continued)

(52) U.S. Cl.
CPC ............. *B60N 2/0155* (2013.01); *B60N 2/90* (2018.02); *F16B 2/20* (2013.01); *F16B 19/00* (2013.01); *F16B 21/075* (2013.01)

(58) Field of Classification Search
CPC .... F16B 2/20; F16B 2/22; F16B 21/06; F16B 21/065; F16B 21/08; F16B 21/082;
(Continued)

(56) References Cited

U.S. PATENT DOCUMENTS

| 5,606,784 A | * | 3/1997 | Hamamoto | ............ | B60N 2/015 24/580.1 |
| 5,649,783 A | * | 7/1997 | Ichikawa | ............... | B60N 2/015 403/386 |

(Continued)

FOREIGN PATENT DOCUMENTS

| JP | S 55-069312 A | 5/1980 |
| JP | H 01-165811 U | 11/1989 |

(Continued)

OTHER PUBLICATIONS

International Search Report (ISR) (PCT Form PCT/ISA/210), in PCT/JP2016/062304, dated May 31, 2016 (English Version).

(Continued)

*Primary Examiner* — Jonathan P Masinick
(74) *Attorney, Agent, or Firm* — McGinn IP Law Firm, PLLC

(57) ABSTRACT

A part fixture which is locked on a locking portion of a vehicle body and which is inserted into a mounting hole on a mount portion provided on a vehicle body to be fixed in place therein to thereby mount the vehicle part on the mount portion, includes an accommodating portion, a locking piece, a pair of flange portions, and a pair of elastic engaging pieces. The elastic engaging pieces each have an engaging claw and an operation knob. When the pair of elastic engaging pieces are deflected inwards of the accommodating portion, the pair of elastic engaging pieces are brought into abutment with the side wall portions or the locking portion of the vehicle part which is accommodated in the accommodating portion so that any further deflection thereof is restricted.

18 Claims, 22 Drawing Sheets

(51) Int. Cl.
*F16B 2/20* (2006.01)
*B60N 2/90* (2018.01)
*F16B 19/00* (2006.01)

(58) Field of Classification Search
CPC ...... F16B 21/084; F16B 21/086; B60N 2/015; B60N 2/0155; B60N 2/01508; B60N 2/01506; B60N 2/01525
See application file for complete search history.

(56) References Cited

U.S. PATENT DOCUMENTS

| | | | | |
|---|---|---|---|---|
| 5,788,314 | A * | 8/1998 | Hayes | B60N 2/015 248/503.1 |
| 5,890,831 | A | 4/1999 | Kato | |
| 6,145,173 | A * | 11/2000 | Suzuki | F16B 5/0607 24/582.1 |
| 6,474,616 | B2 * | 11/2002 | Yamada | B60N 2/01508 248/503.1 |
| 7,231,696 | B2 * | 6/2007 | Asano | B60R 13/0206 24/297 |
| 7,300,089 | B2 * | 11/2007 | Kuroda | B60R 13/0206 24/297 |
| 7,552,516 | B2 * | 6/2009 | Okada | F16B 5/0628 24/297 |
| 7,740,432 | B2 * | 6/2010 | Harada | F16B 21/065 24/293 |
| 8,683,662 | B2 * | 4/2014 | Cooley | F16B 5/065 24/297 |
| 9,150,120 | B2 * | 10/2015 | Antoine | B60N 2/6027 |
| 2007/0272807 | A1 * | 11/2007 | Takagaki | H02G 3/32 248/71 |
| 2015/0321622 | A1 * | 11/2015 | Dickinson | F16B 21/075 24/458 |

FOREIGN PATENT DOCUMENTS

| | | |
|---|---|---|
| JP | H 08-210335 A | 8/1996 |
| JP | H 10-073109 A | 3/1998 |
| JP | 2009-299822 A | 12/2009 |
| JP | 2011-051388 A | 3/2011 |
| WO | WO 2007/105062 A1 | 9/2007 |

OTHER PUBLICATIONS

Written Opinion (PCT Form PCT/ISA/237), in PCT/JP2016/062304, dated May 31, 2016.

* cited by examiner

FIG.13
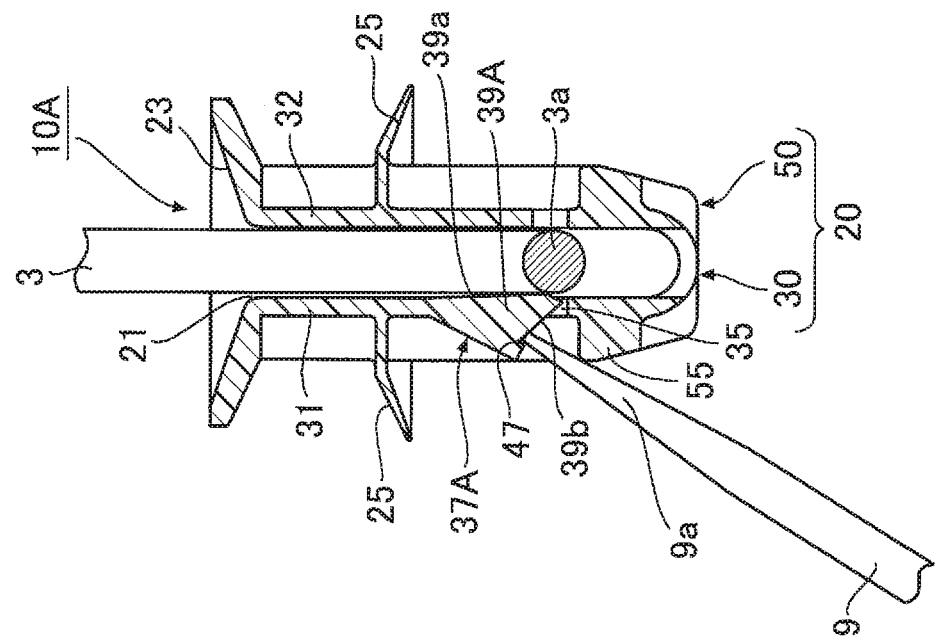
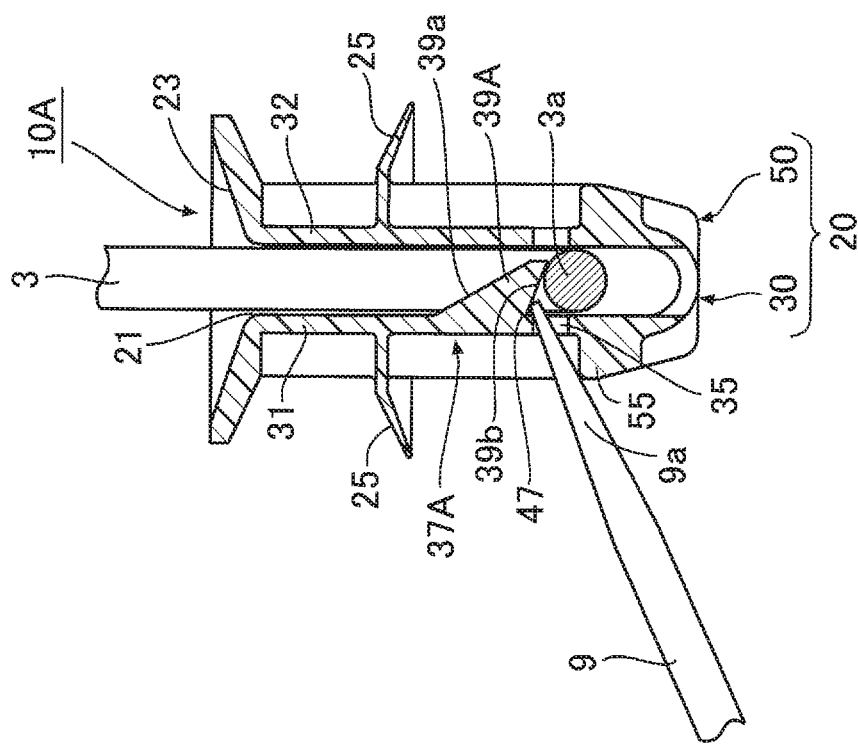

PART FIXTURE

TECHNICAL FIELD

The present invention relates to a part fixture for mounting a vehicle part such as a vehicle seat on a mount portion such as a vehicle body panel.

BACKGROUND ART

A mounting device is used, for example, in mounting a vehicle part such as a vehicle seat on a mount portion such as a vehicle body panel. Namely, a locking portion which extends from a lower side of the vehicle seat is inserted into the mounting device so as to be locked by a locking portion of the mounting device, while the mounting device is inserted into a mounting hole on the vehicle body panel so as to be fixed in place therein, whereby the vehicle seat is mounted on the vehicle body panel via the mounting device.

Conventionally, as a mounting device of this type, a vehicle seat fixing device is described in, for example, Patent Document 1 described below. This vehicle seat fixing device includes a device main body block (hereinafter, referred to as a "main body") which is mounted on a vehicle body and into which a U-shaped locking device of a vehicle seat is inserted and a lock lever (hereinafter, referred to as a "lever") which is assembled to the main body so as to slide to be displaced in a direction which intersects with an inserting direction of the locking device and which is inserted into a frame portion of the U-shaped locking device to thereby restrict a dislocation of the locking device from the main body. Then, a first projecting portion and a first recess portion are provided between the main body and the lever for restricting the lever from sliding to be displaced in a dislocating direction thereof.

A wedge-shaped clip claw is formed integrally on an outer circumference of the main body, and a lower flange is provided to extend therefrom, so that when the main body is inserted into the mounting hole on the floor, the clip claw is brought into engagement with a circumferential edge of a rear side of the mounting hole, and the flange portion is brought into abutment with a circumferential edge of a front side of the mounting hole, whereby the main body is mounted on the floor. The lever has a rod portion and a pair of spring portions. The rod portion is biased towards an interior of the main body by the spring portions, and the rod portion enters an interior of the locking device to prevent the dislocation of the locking device from the main body. Then, when the seat is attempted to be removed from the floor, the lever is pulled against the biasing force of the spring portions to dislocate the rod portion from the locking device, and the seat is lifted up with the rod portion kept dislocated from the locking device, whereby the seat can be removed from the floor.

PRIOR ART DOCUMENT

Patent Document

Patent Document 1: JP-A-2011-51388

SUMMARY OF INVENTION

Problems to be Solved by Invention

In the fixing device described in Patent Document 1 described above, however, since the fixing device is made up of the two parts such as the main body and the lever, the number of parts is increased, resulting in a disadvantage that the production cost is increased. In addition, since the main body has the wedge-shaped clip claw which is brought into engagement with the circumferential edge on the rear side of the mounting hole and the lower flange portion which is brought into abutment with the circumferential edge on the front side of the mounting hole, the main body cannot basically be removed from the mounting hole. Due to this, with the seat removed from the floor, the main body is left locked in the mounting hole, and it becomes difficult to remove from the main body from the mounting hole.

Thus, an object of the invention is to provide a part fixture which can reduce the number of parts involved and which can easily be removed from a mount portion.

Means for Solving Problems

With a view to achieving the object, according to the invention, there is provided a part fixture which is locked on a locking portion of a vehicle body and which is inserted into a mounting hole on a mount portion provided on a vehicle body to be fixed in place therein to thereby mount the vehicle part on the mount portion, comprising: an accommodating portion which is formed into the shape of a frame which has an opening portion through which the locking portion can be inserted and has wall portions which are disposed so as to face each other and at least a pair of side wall portions which are disposed so as to intersect with a direction in which the wall portions are disposed to face each other, which accommodates the locking portion of the vehicle part and which is inserted into the mounting hole; a locking piece which is provided on the wall portion of the accommodating portion so as to extend therefrom and which locks on the locking portion which is accommodated in the accommodating portion; and a pair of elastic engaging pieces which are provided individually on the pair of side wall portions of the accommodating portion so as to extend therefrom in such a way as to be deflected, and wherein the elastic engaging pieces each have: an engaging claw which is brought into engagement with a circumferential edge on a rear side of the mounting hole; and an operation knob which is disposed on a front side of the mounting hole with the engaging claw left in engagement with the circumferential edge on the rear side of the mounting hole and which is configured to deflect the elastic engaging piece inwards of the accommodating portion to thereby release an engagement of the engaging claw with the circumferential edge on the rear side of the mounting hole.

In the part fixture of the invention, it is preferable that the pair of elastic engaging pieces extend outwards from the pair of side wall portions, so that when the elastic engaging pieces are deflected inwards of the accommodating portion, the elastic engaging pieces are brought into abutment with the side wall portions or the locking portion of the vehicle part which is accommodated in the accommodating portion so that any further deflection thereof is restricted.

In the part fixture of the invention, it is preferable that the side wall portions of the accommodating portion have a pair of outer frame-shaped portions on which the elastic engaging pieces are provided and a pair of inner wall portions which are disposed inwards of the pair of outer frame-shaped portions with a predetermined space provided therebetween and that when the elastic engaging pieces are deflected inwards, the elastic engaging pieces are brought into abutment with the inner wall portions so that any further deflection thereof is restricted.

In the part fixture of the invention, it is preferable that the operation knob is disposed apart from a circumferential edge on the front side of the mounting hole with a predetermined space defined therebetween in such a state that the engaging claws of the elastic engaging pieces are in engagement with the circumferential edge on the rear side of the mounting hole.

In the part fixture of the invention, it is preferable that gripping surfaces of the operation knobs which are used when the operation knobs are operated are formed into inclined surfaces which are inclined diametrically further outwards as the gripping surfaces extend further away from the engaging claws.

In the part fixture of the invention, it is preferable that the part fixture has further a locking releasing means for releasing the engagement of the locking piece with the locking portion and that the locking releasing means is made up of a tool passage hole which is formed in the wall portion of the accommodating portion which faces the wall portion thereof on which the locking piece is provided so that a distal end portion of a tool can be passed therethrough.

In the part fixture of the invention, it is preferable that the part fixture has further a locking releasing means for releasing the engagement of the locking piece with the locking portion and that the locking releasing means is made up of a groove portion which is formed in the wall portion of the accommodating portion on which the locking piece is provided so that a distal end portion of a tool can be locked therein.

In the part fixture of the invention, it is preferable that the pair of elastic engaging pieces are provided on the side wall portions of the accommodating portion so as to individually extend obliquely outwards from distal end sides of the side wall portions in relation to an inserting direction in which the part fixture is inserted into the mounting hole towards proximal end sides of the side wall portions in relation to the same inserting direction.

In the part fixture of the invention, it is preferable that ribs are formed on both sides of the elastic engaging piece of each of the side wall portions of the accommodating portion, ribs each having a tapered portion which becomes narrower towards a tip thereof and that with the accommodating portion inserted into the mounting hole and the engaging claws of the pair of elastic engaging pieces left in engagement with the circumferential edge on the rear side of the mounting hole, when an eccentric load is exerted on the accommodating portion so as to deflect inwards one of the pair of elastic engaging pieces, the rib on the one of the pair of elastic engaging pieces is brought into abutment with an inner circumference of the mounting hole before the other of the pair of elastic engaging pieces is released from the engagement with the circumferential edge on the rear side of the mounting hole.

Advantageous Effects of Invention

According to the invention, when attempting to remove the part fixture from the mount portion, since the engagement of the engaging claws with the circumferential edge on the rear side of the mounting hole can be released by operating the operation portions so as to deflect the elastic engaging pieces inwards, the part fixture can be removed from the mount portion. In addition, since the locking piece which locks on the locking portion and the elastic engaging pieces which have the engaging claws which are brought into engagement with the mounting hole are formed integrally so as to extend from the accommodating portion, the number of parts involved can be decreased so as to reduce the production cost.

BRIEF DESCRIPTION OF DRAWINGS

FIG. 13 shows states where the part fixture is removed from a locking portion of a vehicle part, in which (a) is an explanatory view showing a state where a distal end portion of a tool is locked in a groove portion, and (b) is an explanatory view showing a state where the locking piece is deflected to be deformed by a tool to thereby release an engagement between the locking piece and the locking portion.

EMBODIMENTS OF INVENTION

Figure 1:
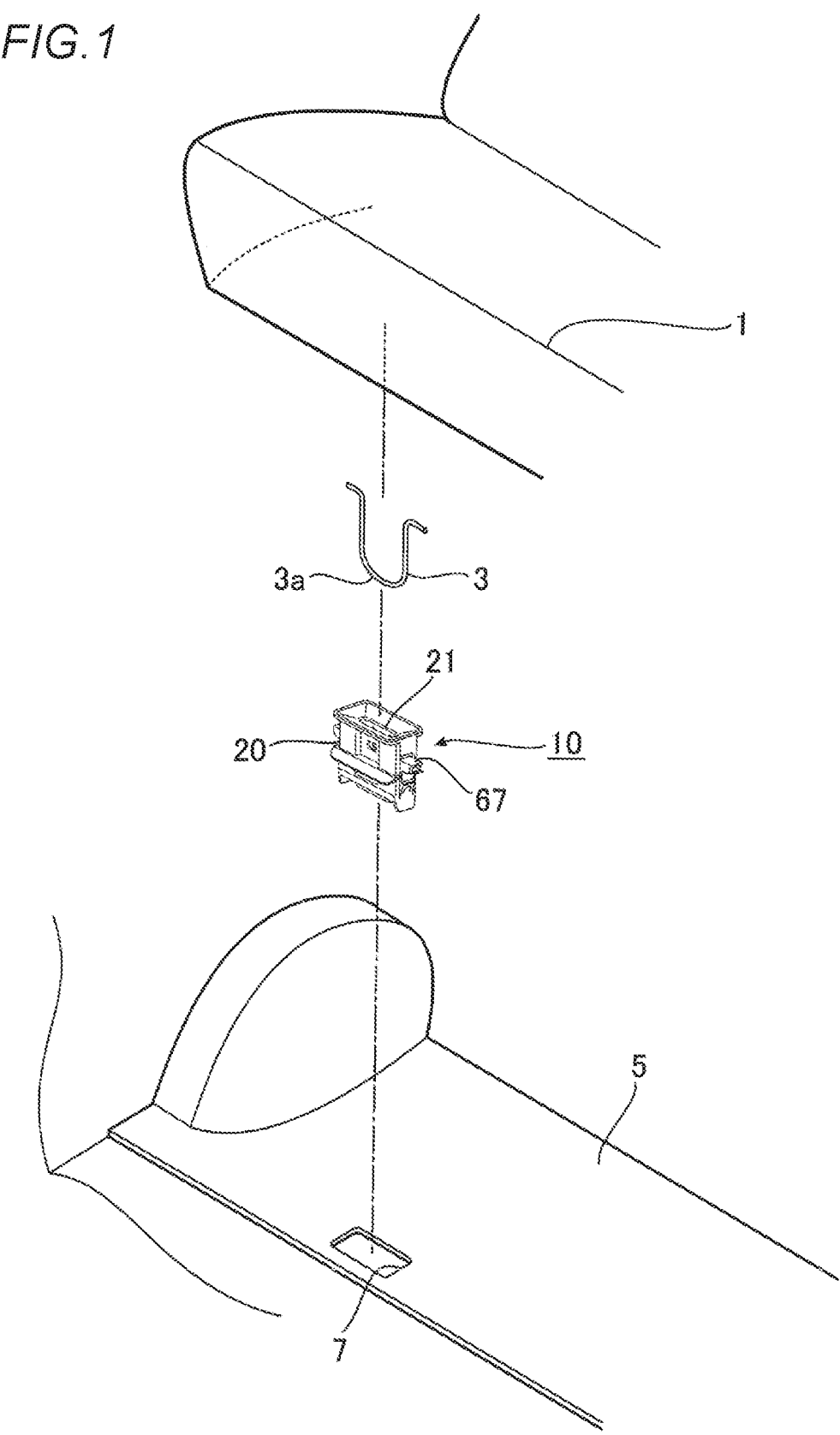
FIG. 1 shows an embodiment of a part fixture of the invention and is a perspective view showing a state in which a vehicle part is mounted on a mount portion using the part fixture.

Hereinafter, referring to the drawings, an embodiment of a part fixture of the invention will be described.

Figure 6:
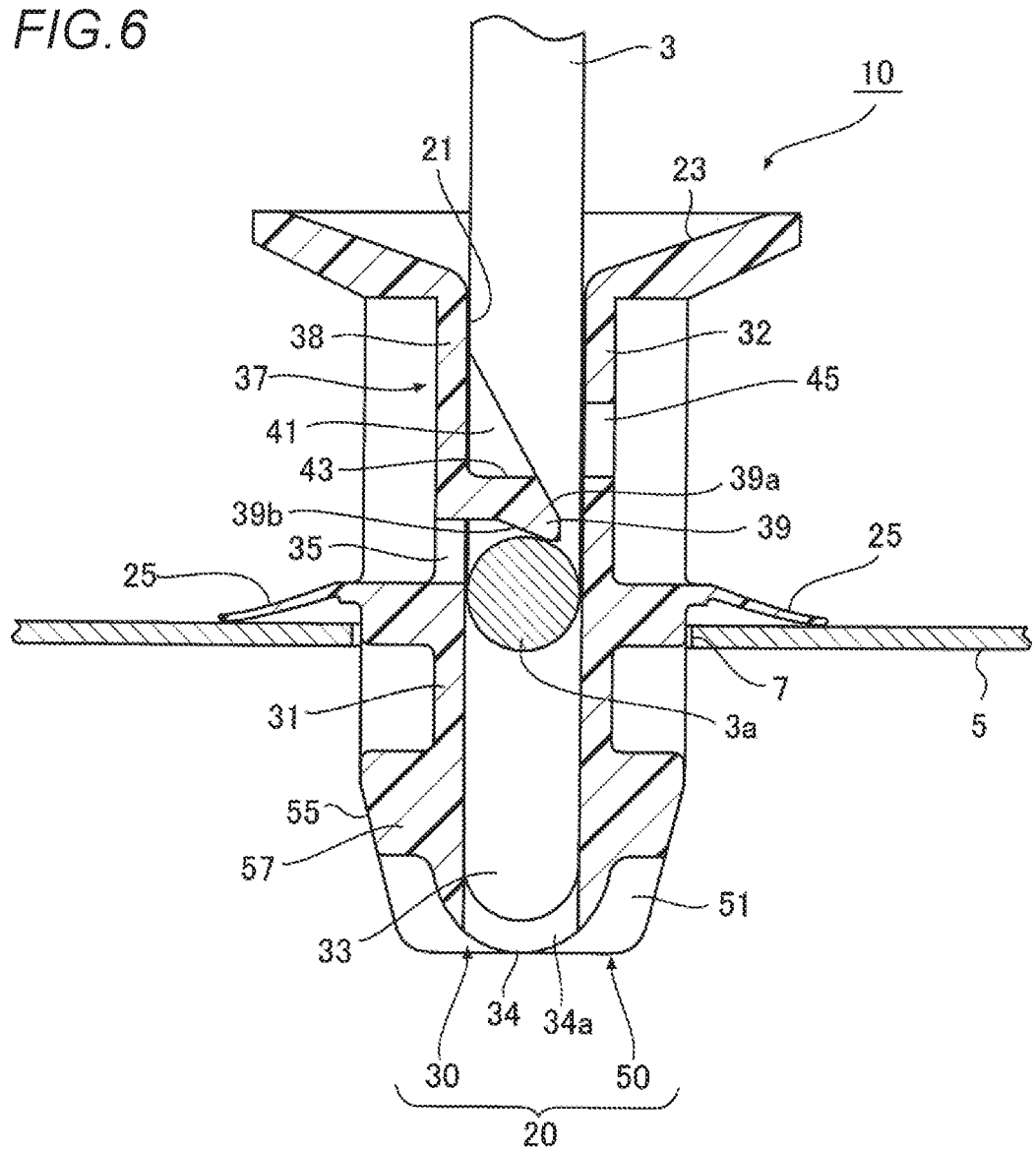
FIG. 6 is a sectional explanatory view showing a state in which a vehicle part is mounted on a mount portion via a locking portion using the part fixture.
Figure 7:
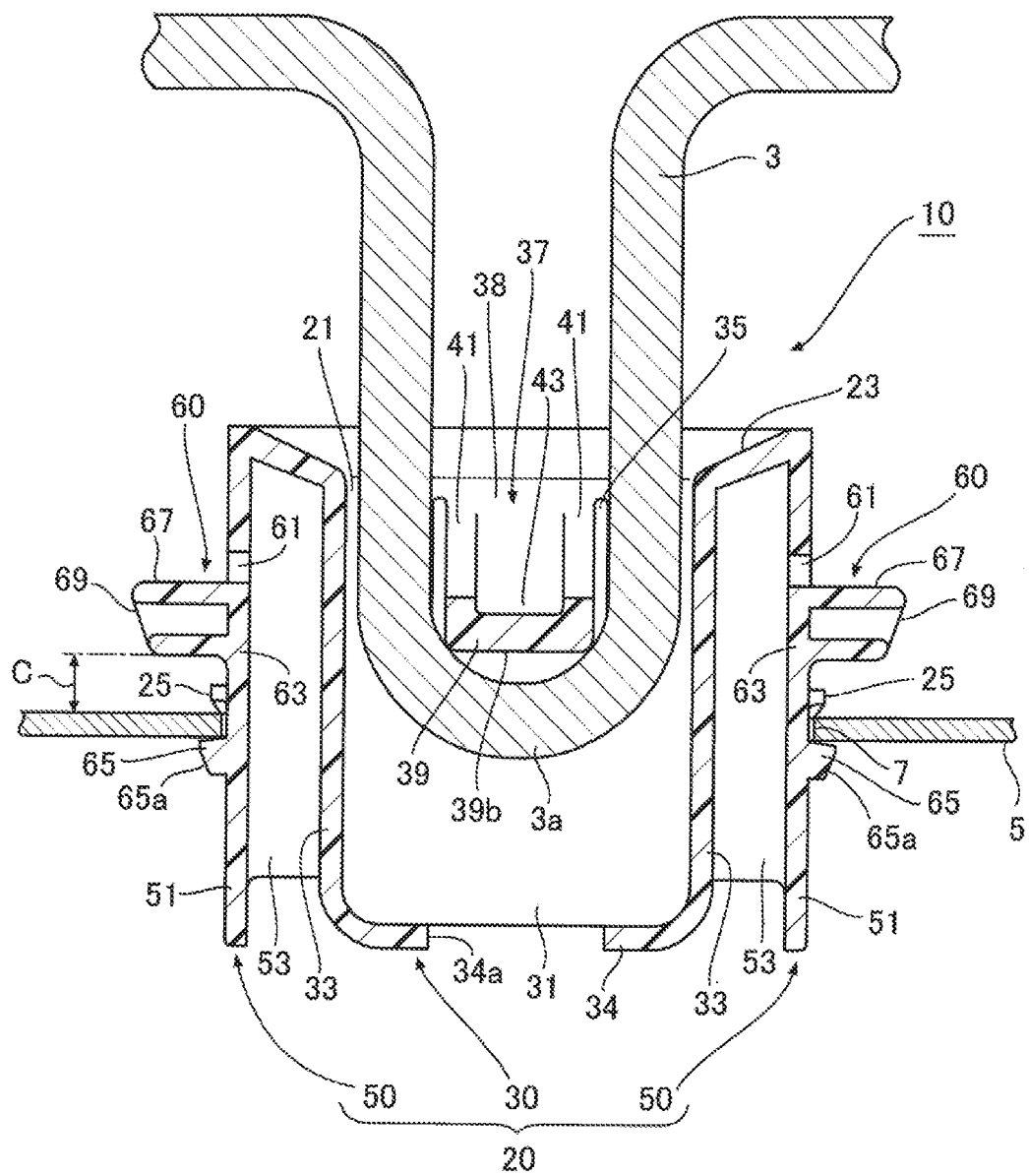
FIG. 7 is a sectional explanatory view seen from a different direction from a direction in which the part fixture is seen in FIG. 6 which shows the state in which the vehicle part is mounted on the mount portion via the locking portion using the part fixture.

As shown in FIGS. 1, 6 and 7, a part fixture 10 (hereinafter, referred to simply as a "mounting device 10") of this embodiment is designed to be locked on a locking portion 3 of a vehicle part 1 while it is inserted into a mounting hole 7 on a mount portion 5 which is provided on a vehicle body to be fixed in place therein to thereby mount the vehicle part 1 on the mount portion 5. A vehicle rear seat is used as the vehicle part 1 in this embodiment, and the locking portion 3, which is a U-shaped hook made by bending a wire having a circular cross section into a U shape, is provided on the vehicle part 1 so as to extend from a lower side thereof. However, there is no specific limitation on the vehicle part as long as a vehicle part has a locking portion, and there is no specific limitation on the shape of the locking portion 3, either. Further, although, for example, a vehicle body panel or a vehicle body frame is raised as the mount portion 5, there is no specific limitation on the mount portion 5, either. The mount hole 7 provided on the mount portion 5 has an elongated shape.

Figure 2:
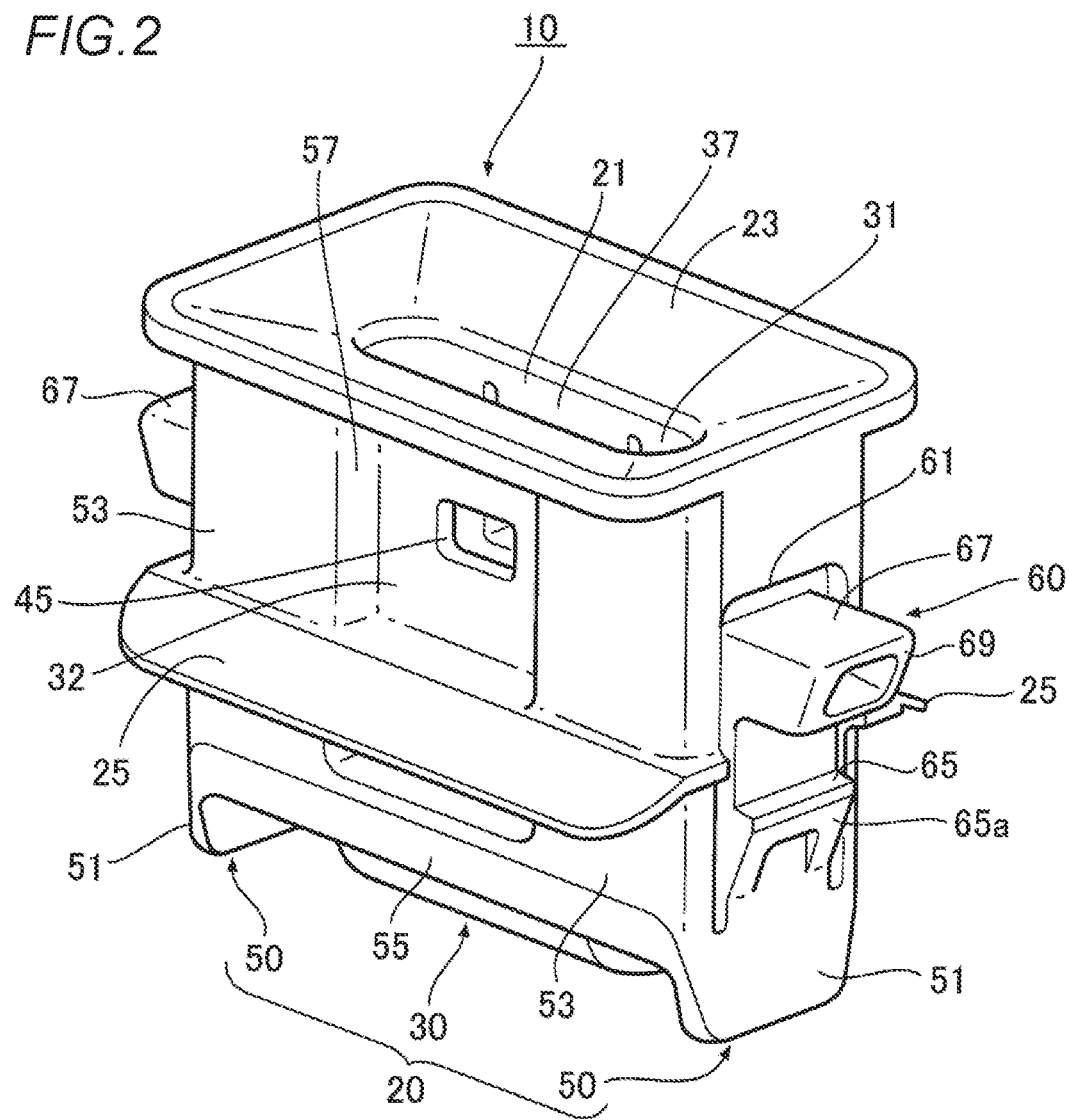
FIG. 2 is a perspective view of the part fixture.
Figure 4:
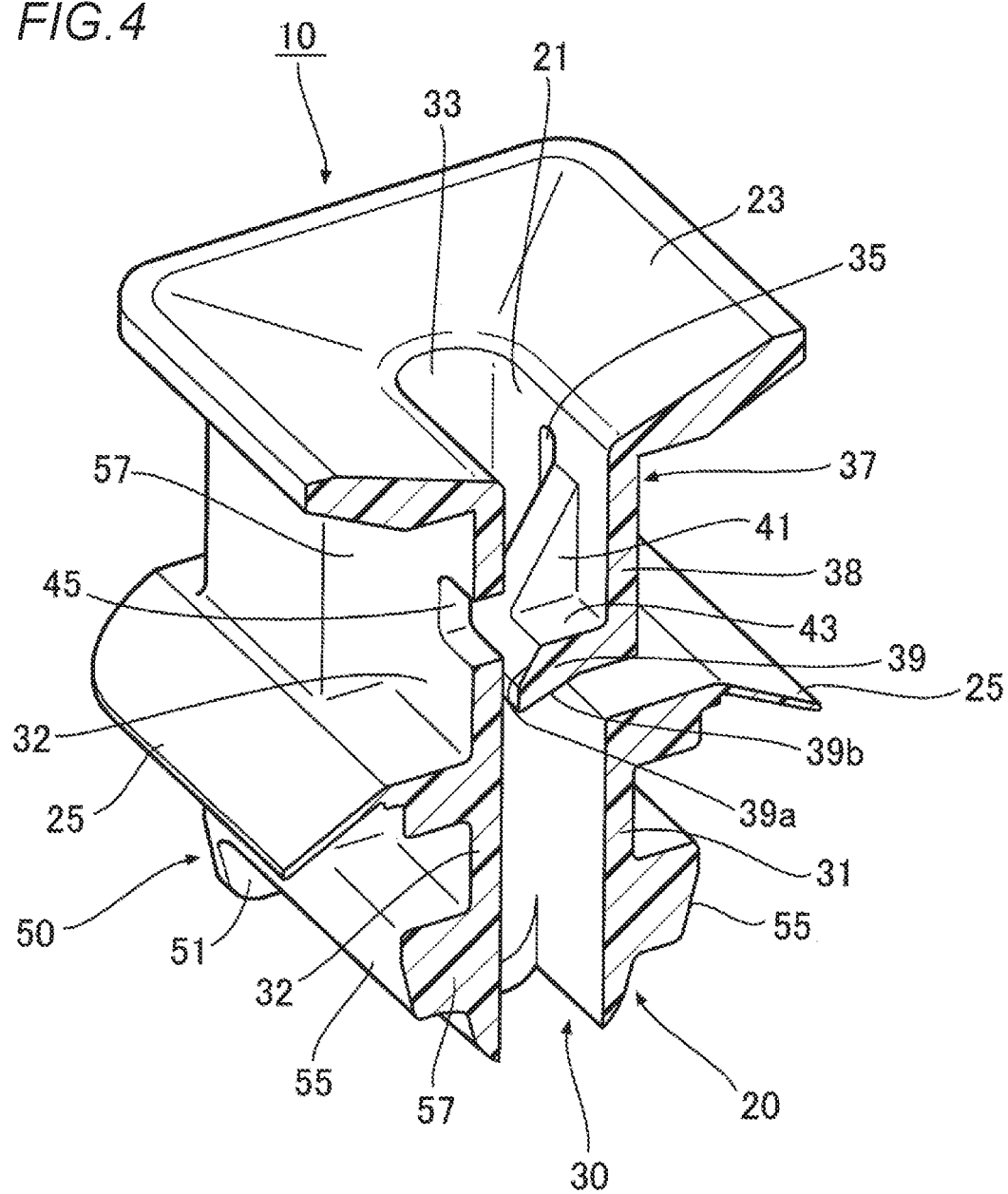
FIG. 4 is a perspective view partially in section of the part fixture.

As shown in FIGS. 2, 4 and 7, the mounting device 10 of this embodiment has an accommodating portion 20 which has an elongated opening portion 21 which fits the locking portion 3 of the vehicle part 1, which has a frame shape which is surrounded by a plurality of wall portions, which accommodates the locking portion 3 of the vehicle part 1 and which is inserted into the mounting hole 7. In addition, a guide portion 23 is provided on this accommodating portion 20 so as to expand gradually obliquely upwards from an upper circumferential edge portion of the opening portion 21, whereby the locking portion 3 is easily guided into the accommodating portion 20 to be accommodated therein. Further, a pair of flange portions 25, 25 are provided on the wall portions of the accommodating portion 20 which extend along a longitudinal direction of the opening portion 21 at portions thereon which lie closer to distal end portions thereof in relation to an inserting direction in which the accommodating portion 20 is inserted into the mounting hole 7 so as to extend therefrom to thereby be brought into abutment with a circumferential edge on a front side of the mounting hole 7.

As shown in FIGS. 2 to 5, the accommodating portion 20 of this embodiment is made up of an inner frame-shaped portion 30 which has the frame shape in which the opening portion 21 is provided and which accommodates the locking portion 3 in an interior thereof and outer frame-shaped portions 50 which are disposed apart from at least inner wall portions 33, 33 of the inner frame-shaped portion 30 which constitute longitudinal ends of the opening portion 21 with a predetermined space provided therebetween. The "accommodating portion" in this invention should be formed into the shape of a frame having wall portions which are disposed so as to face each other and at least a pair of side walls which are disposed so as to intersect with the direction in which the wall portions are disposed so as to face each other, and hence, the inner frame-shaped portion and the outer frame-shaped portions of this embodiment may not be provided (this configuration will be described in an embodiment shown in FIGS. 14 to 21).

Figure 5:
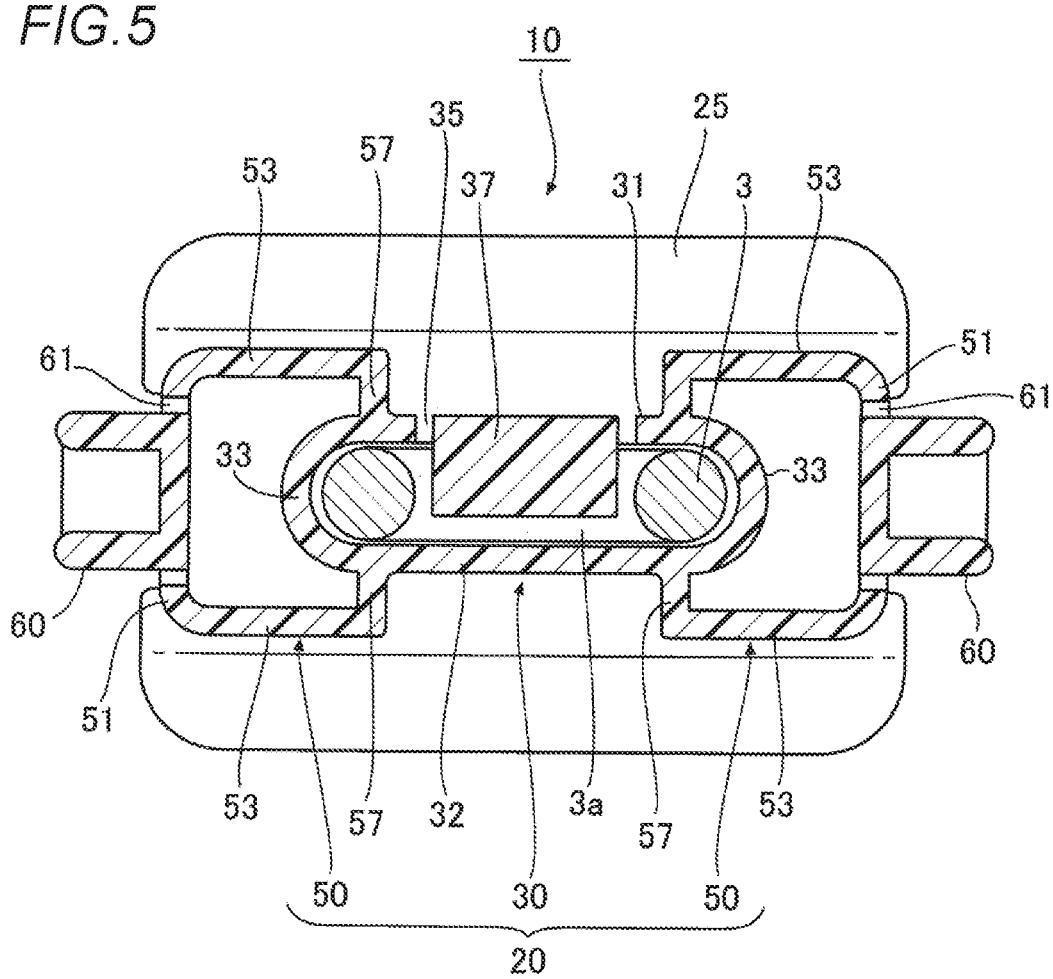
FIG. 5 is a horizontal sectional view of the part fixture.

Firstly, the construction of the inner frame-shaped portion 30 will be described. As shown in FIG. 5, this inner frame-shaped portion 30 is formed into the shape of a frame made up of a pair of front and rear wall portions 31, 32 which are disposed so as to extend parallel to each other along the longitudinal direction of the opening portion 21 and on which the flange portions 25 are disposed and the pair of left and right inner wall portions 33, 33 which are disposed so as to intersect with a direction in which the pair of wall portions 31, 32 are disposed to face each other (here, so as to intersect with the longitudinal direction of the opening portion 21) and which are each formed into a slightly rounded arc-shaped curved surface which connect together ends of the pair of wall portions 31, 32. It should be noted that the pair of inner wall portions 33, 33 are disposed inwards of a pair of outer wall portions 51, 51, which will be described later, with a predetermined space provided therebetween (refer to FIG. 5).

Figure 3:
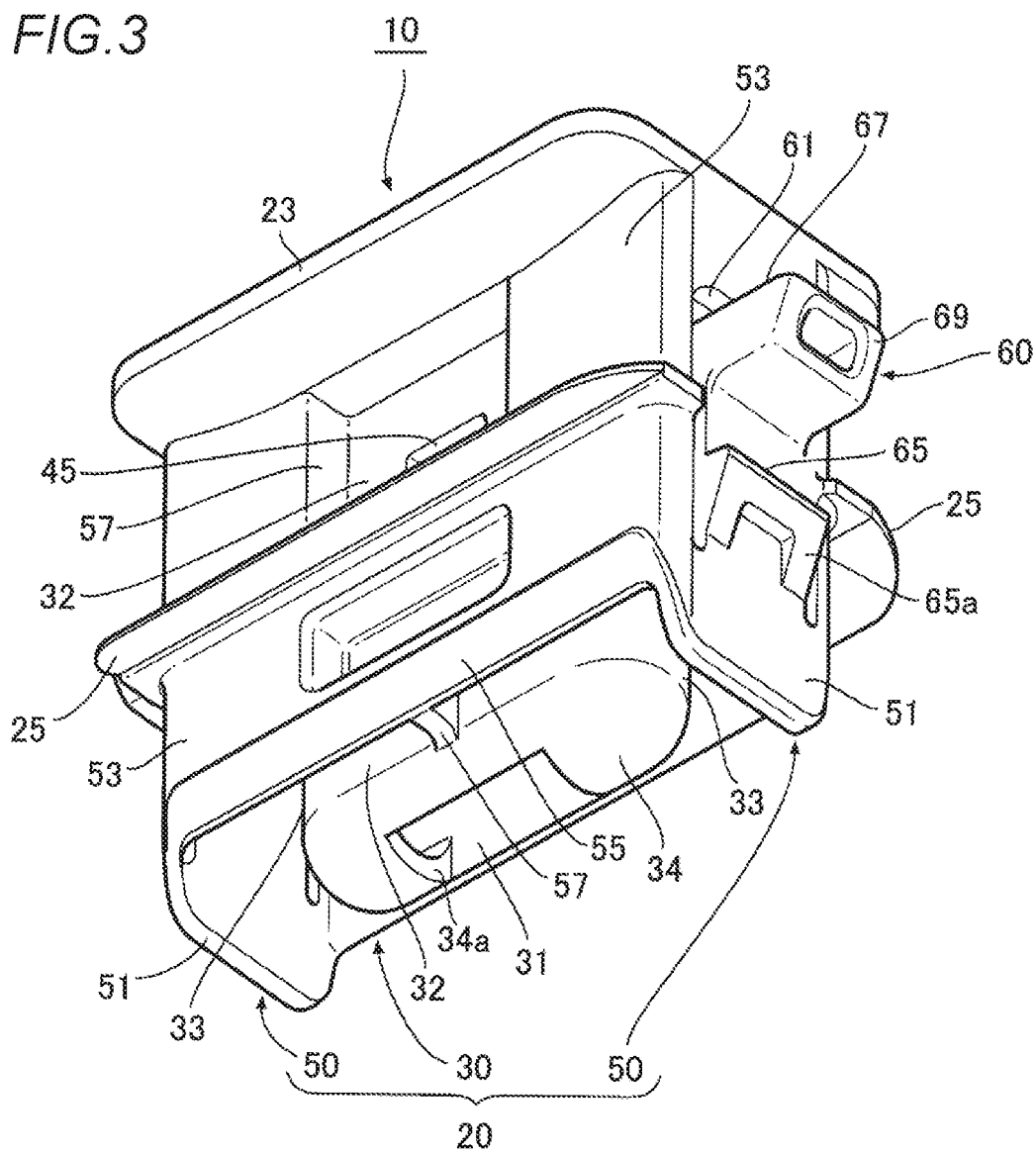
FIG. 3 is a perspective view of the part fixture as seen from a direction which is different from a direction in which the part fixture is seen in FIG. 2.

Additionally, as shown in FIGS. 3 and 6, a bottom wall 34 having a cut-out hole 34a which is provided in a center thereof is disposed at a distal end side of the inner frame-shaped portion 30 in relation to the inserting direction in which the accommodating portion 20 is inserted into the mounting hole 7, that is, at a distal end side opening which is surrounded by the wall portions 31, 32 and the inner wall portions 33, 33 and constitutes a portion which receives the locking portion 3 when the locking portion 3 is accommodated in the inner frame-shaped portion 30.

As shown in FIGS. 4 and 6, a locking piece 37 is provided on the wall portion 31 so as to extend therefrom to thereby lock on the locking portion 3 when the locking portion 3 is accommodated in the inner frame-shaped portion 30. In this embodiment, the locking piece 37 is formed so as to be deflected at a longitudinally central portion of the wall portion 31 in a position which lies closer to the opening portion 21 than to the flange portion 25 and which lies adjacent to the flange portion 25 via a substantially angularly U-shaped slit 35.

As shown in FIGS. 4, 6 and 7, this locking piece 37 is made up of a strap-shaped piece 38 which is fixed to a side of the wall portion 31 which lies to face the opening portion 21 at one end portion thereof so as to be deflected and which extends along an axial direction of the wall portion 31 via the slit 35 and a locking claw 39 which projects at right angles from a distal end side of the strap-shaped piece 38 towards an interior of the accommodating portion and which is inserted into an inside of a bent portion 3a of the locking portion 3 so as to be locked on the locking portion 3 and hence has a substantially L-shaped section.

Figure 10:
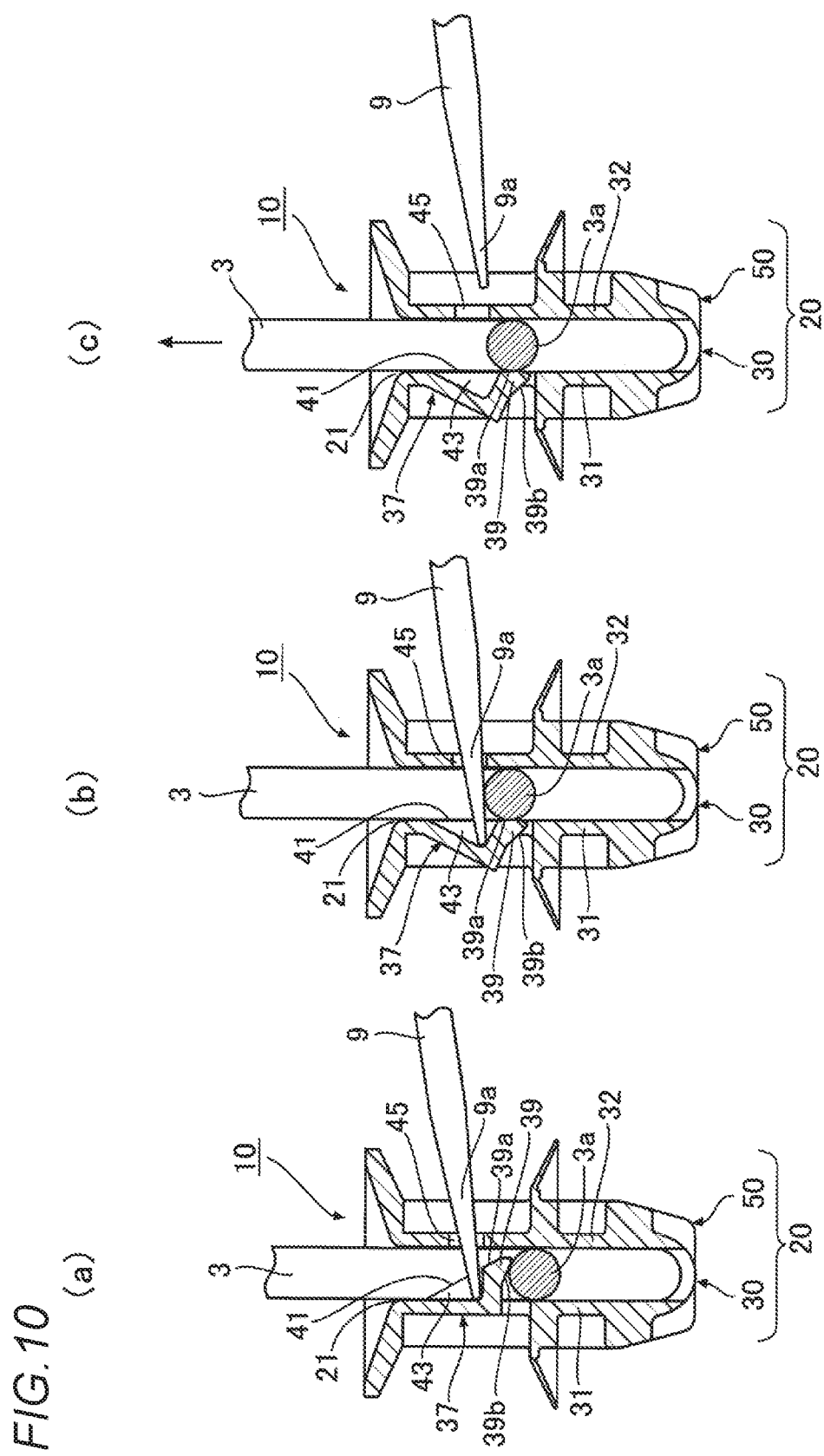
FIG. 10 shows states where the part fixture is removed from the locking portion of the vehicle part, in which (a) is an explanatory view showing a state where a distal end portion of a tool is brought into abutment with a locking piece through a tool passage hole, (b) is an explanatory view showing a state where the locking piece is deflected to be deformed by the tool, and (c) is an explanatory view showing a state where an engaged state between the locking piece and the locking portion is released.

As shown in FIG. 6, a tapered surface 39a, whose projecting height becomes gradually higher as the tapered surface 39a extends further in a direction in which it moves away from the opening portion 21, is formed on the locking claw 39 in a position which lies at a distal end side of the locking claw 39 and which lies to face the opening portion 21, and this tapered surface 39a constitutes a portion which makes it easy for the locking piece 37 to be dislocated from the bent portion 3a of the locking portion 3 when the locking piece 37 is pushed by a distal end portion 9a of a tool 9 as shown in FIG. 10(a) to thereby facilitate the release of locking of the locking piece 37 on the bent portion 3a of the locking portion 3 (refer to FIG. 10(b)). Further, a reversely tapered surface 39b, whose projecting height becomes gradually higher as the reversely tapered surface 39b extends in a direction in which it moves away from the opening portion 21, is formed on the locking claw 39 in a position which lies at the distal end side of the locking claw 39 and which lies on a side which is opposite to the opening portion 21, and this reversely tapered surface 39b constitutes a portion which is locked on the locking portion 3 (refer to FIG. 6).

As shown in FIGS. 4 and 6, a pair of ribs 41, 41 having the shape of a triangular plate are provided on inner surfaces of the strip-shaped piece 38 and the locking claw 39 which lie to face the accommodating portion and at both sides thereof in a width-wise direction, and a recess portion 43 is provided therebetween. The pair of ribs 41, 41 are designed not only to be pressed by the locking portion 3 to deflect the locking piece 37 when the locking portion 3 is accommodated in the inner frame-shaped portion 30 but also to reinforce the locking piece 37. On the other hand, the recess portion 43 is designed not only to receive the distal end portion 9a of the tool 9 (refer to FIG. 10) for releasing the locking of the locking piece 37 on the locking portion 3 when the distal end portion 9a of the tool 9 is inserted to be disposed in the recess portion 43 but also to prevent a positional deviation of the distal end portion 9a.

On the other hand, as shown in FIGS. 4 and 6, a tool passage hole 45 through which the distal end portion 9a of the tool 9 can be inserted is formed in the wall portion 32 which faces the wall portion 31 on which the locking piece 37 is provided. In this embodiment, the tool passage hole 45, which is a rectangular hole and which communicates with an interior of the inner frame-shaped portion 30, is formed at a width-wise or longitudinal center of the wall portion 32 and in a position which lies closer to the opening portion 21 than to the locking claw 39 of the locking piece 37. As shown in FIGS. 10(a), 10(b), the distal end portion 9a of the tool 9 is inserted into the interior of the accommodating portion through the tool passage hole 45 to be disposed in the recess portion 43 on the inner surface side of the locking piece 37 then, the locking piece 37 is deflected outwards of the accommodating portion by the tool 9 which is so pushed into the accommodating portion, whereby the locked state of the locking claw 39 on the locking portion 3 is released. Namely, in this embodiment, the tool passage hole 45 constitutes a "locking releasing means" of the invention.

Next, the construction of the outer frame-shaped portion 50 will be described. As shown in FIG. 5, the outer frame-shaped portion 50 of this embodiment is formed into the shape of a frame having a substantially angular U-shape which is made up of the outer wall portion 51 which is disposed outwards of the inner wall portion 33 of the inner frame-shaped portion 30 with the predetermined space provided therebetween and a pair of wall portions 53, 53 which extend parallel to each other from both sides of the outer wall portion 51 and which are disposed so as to face each other outwards of the wall portions 31, 32 of the inner frame-shaped portion 30. Then, the pair of outer frame-shaped portions 50, 50 are disposed so as to surround externally longitudinal end portions of the inner frame-shaped portion 30 with the predetermined space provided therebetween, and the pair of outer wall portions 51, 51 are disposed outwards of the pair of inner wall portions 33, 33 of the inner frame-shaped portion 30 with the predetermined space provided therebetwen. Thus, a double wall construction is provided in this way.

Additionally, as shown in FIGS. 2 and 3, distal end portions of the pair of outer frame-shaped portions 50, 50 in relation to the inserting direction into the mounting hole 7 are integrally connected together by distal end wall portions 55. Further, as shown in FIGS. 3 to 5, both wall portions 53, 53 of each outer frame-shaped portion 50 and the distal end wall portions 55 are connected to the wall portions 31, 32 of the inner frame-shaped portion 30 via connecting walls 57, so that the pair of outer frame-shaped portions 50, 50 are disposed outwards of the longitudinal end portions of the inner frame-shaped portion 30. Widthwise or longitudinally central portions of the wall portions 31, 32 of the inner frame-shaped portion 30 are exposed by disposing the outer frame-shaped portions 50 relative to the inner frame-shaped portion 30 in the way described above, and the distal end portion 9a of the tool 9 can be inserted into the accommodating portion through the tool passage hole 45 in the wall portion 32 from the outside (refer to FIGS. 2 and 3). The outer wall portion 51 of each outer frame-shaped portion 50 extends further towards the distal end side than the wall portions 53, and external surfaces of distal end portions of the wall portions 53 of each outer frame-shaped portion 50 and the distal end side wall portions 55 are tapered so as to enhance the ease with which the accommodating portion 20 is inserted into the mounting hole 7 (refer to FIGS. 2 and 3).

The outer frame-shaped portions 50 of this embodiment are each formed into the shape of the frame having the angular U-shape so as to cover only the longitudinal end portions of the inner frame-shaped portion 30 however, the invention is not limited to this construction. For example, the outer frame-shaped portions may be formed into the shape of a frame which surrounds a full circumference of the inner frame-shaped portion 30, so that the whole of the accommodating portion 20 is made into a double frame construction. Only the pair of outer wall portions 51, 51 may be provided outwards of the pair of inner wall portions 33, 33 of the inner frame-shaped portion 30 with the predetermined space provided therebetween in place of disposing the outer frame-shaped portions 50.

In this embodiment, the pair of inner wall portions 33, 33 of the inner frame-shaped portion 30 and the pair of outer wall portions 51, 51 of the pair of outer frame-shaped portions 50 constitute a "pair of side wall portions" of the invention.

Then, a pair of elastic engaging pieces 60, 60, which can be deflected, are provided on the outer wall portions 51, 51 of the pair of outer frame-shaped portions 50, 50 which are disposed outwards of the pair of inner wall portions 33, 33 of the inner frame-shaped portion 30 so as to extend therefrom.

As shown in FIGS. 2 and 3, each elastic engaging piece 60 has a strap-shaped piece 63 which can be deflected via a slit 61 having a substantially angular U-shape. A free end side of the strap-shaped piece 63 is disposed on a side which lies to face the opening portion 21 and a fixed end side thereof is disposed on a side which lies to face a distal end side of the accommodating portion 20.

Then, as shown in FIGS. 2, 3 and 7, an engaging claw 65, which is brought into engagement with a circumferential edge on a rear side of the mounting hole 7, is provided on an outer surface of the strap-shaped piece 63 in a position lying further distal towards the distal end side of the accommodating portion 20 than the flange portions 25 so as to project therefrom. A tapered surface 65a is formed on an outer surface of the engaging claw 65 in such a way that its projecting height becomes gradually lower as it extends towards the distal end side of the accommodating portion 20 to thereby enhance the ease with which the accommodating portion 20 is inserted into the mounting hole 7.

Additionally, as shown in FIGS. 2, 3 and 7, an operation knob 67 is provided on the outer surface of the strap-shaped piece 63 at the free end side thereof so as to project therefrom. This operation knob 67 is disposed on a front side of the mounting hole 7 and deflects the elastic engaging piece 60 inwards of the accommodating portion so as to release the engagement of the engaging claw 65 with the circumferential edge on the rear side of the mounting hole 7. This operation knob 67 is disposed on the front side of the mounting hole 7 so that the operator can grip thereon to control the elastic engaging piece 60 in this embodiment, in particular, the control knob 67 is disposed apart from a circumferential edge on the front side of the mounting hole 7 with a predetermined space C provided therebetween in such a state that the engaging claw 65 is in engagement with the circumferential edge on the rear side of the mounting hole 7 and the fastening device 10 is fixed in place in the mounting hole 7 (refer to FIG. 7).

The pair of elastic engaging pieces 60, 60 extend outwards from the pair of side wall portions (here, the outer wall portions 51, 51) and are brought into abutment with the side wall portions when deflected inwards of the accommodating portion 20 so as to restrict any further deflection thereof. It should be noted that the pair of elastic engaging pieces may be brought into abutment with the locking portion 3 of the vehicle part 1 so that any further deflection thereof is restricted (this configuration will be described in an embodiment shown in FIG. 22). When the elastic engaging pieces are brought into abutment with the corresponding side wall portions, opening portions into which the elastic engaging pieces enter are not provided on the side wall portions, whereas when the elastic engaging pieces are brought into abutment with the locking portion 3 of the vehicle part 1 which is accommodated in the accommodating portion, opening portions into which the elastic engaging pieces enter are provided on the side wall portions.

Figure 8:
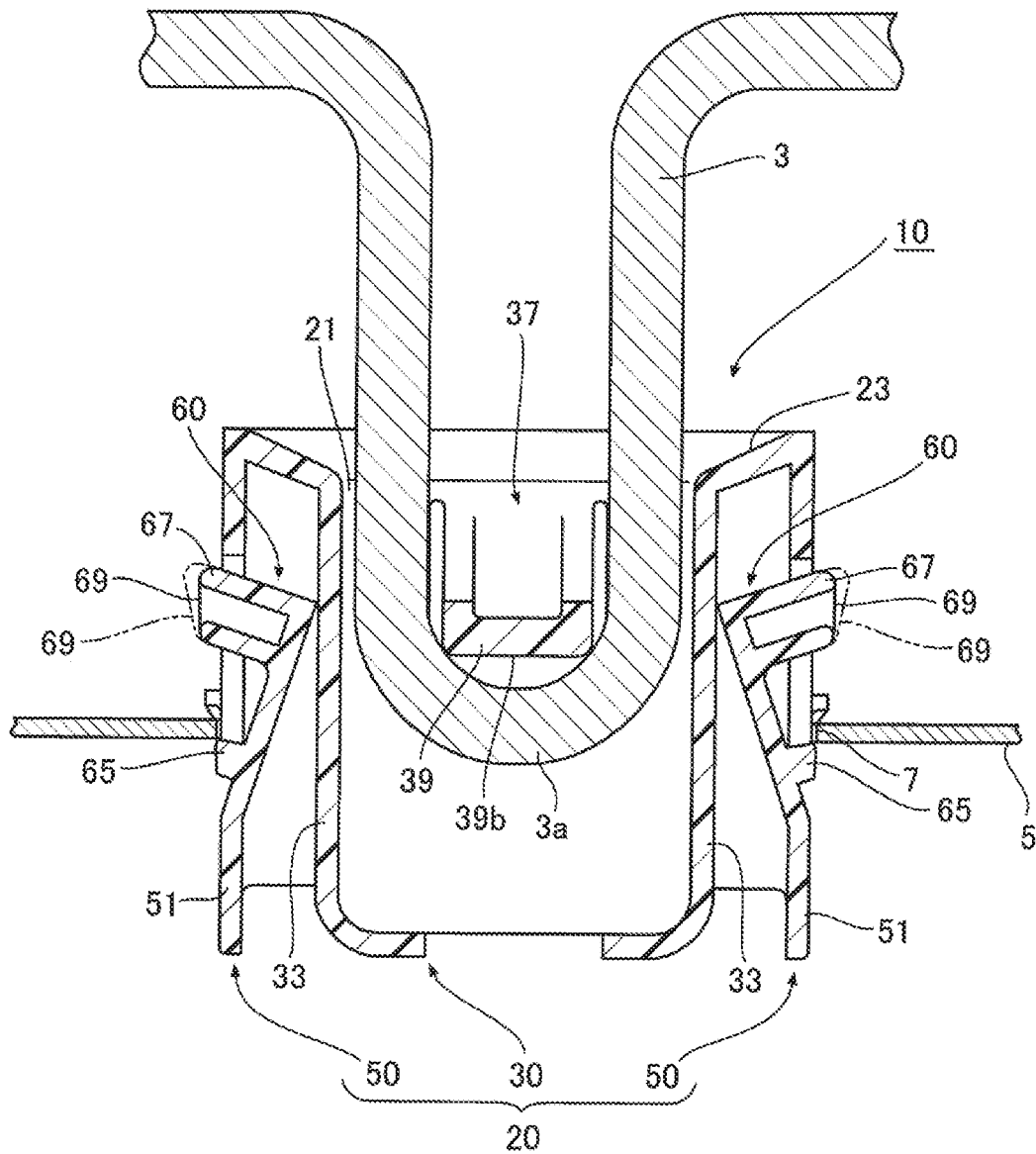
FIG. 8 is a sectional explanatory view showing a case where the locking portion is attempted to be pulled out from the state where the vehicle part is mounted on the mount portion.

In this embodiment, the pair of elastic engaging pieces 60, 60 are brought into abutment with the pair of inner wall portions 33, 33 of the inner frame-shaped portion 30 when they are deflected maximum inwards of the accommodating portion as shown in FIG. 8 by griping on gripping surfaces 69 which are outer surfaces of the control knobs 67, whereby any further deflection of these elastic engaging pieces 60, 60 is restricted. Further, as shown in FIG. 7, the griping surfaces 69 of the operation knobs 67 of this embodiment are formed into inclined surfaces which expand gradually diametrically farther away from each other as the gripping surfaces 69 extend further in a direction in which they move away from the engaging claws 65 before they are operated. Thus, even though the pair of elastic engaging pieces 60, 60 are deflected maximum so that the pair of elastic engaging pieces 60, 60 are brought into abutment with the pair of inner wall portions 33, 33 of the inner frame-shaped portion 30 as shown in FIG. 8, the gripping surfaces 69, 69 are made to remain almost parallel to each other (refer to FIG. 8) or inclined so as to expand gradually diametrically farther away from each other as the gripping surfaces 69 extend further in the direction in which they move way from the engaging claws 65 (refer to chain double-dashed lines in FIG. 8).

Next, a method for using the mounting device 10 which is constructed in the way described heretofore and a working effect thereof will be described.

Firstly, the locking portion 3 of the vehicle part 1 is aligned with the longitudinal direction of the opening portion 21 of the accommodating portion 20 of the mounting device 10, whereafter the locking portion 3 is continuously pushed into the inner frame-shaped portion 30 so as to be accommodated therein. Then, the locking portion 3 enters the interior of the inner frame-shaped portion 30 through the opening portion 21 while being guided by the guide portion 23, and the locking portion 3 presses against the ribs 41, 41 on the inner surface side of the locking piece 37, whereby the locking piece 37 is deflected outwards of the accommodating portion. Thereafter, when the locking portion 3 rides over the locking claw 39 via the tapered surface 39a, the locking piece 37 elastically restores its original state, and the locking claw 39 enters the inside of the bent portion 3a of the locking portion 3, whereby the locking portion 3 is locked on the reversely tapered surface 39b of the locking claw 39 thus, the locking portion 3 can be installed in the mounting device 10 in such a state that the locking portion 3 is prevented from being dislocated from the mounting device 10 (refer to FIGS. 6 and 7).

Following this, the longitudinal direction of the accommodating portion 20 of the mounting device 10 is aligned with the elongated mounting hole 7 of the mount portion 5, and the mounting device 10 is inserted into the mounting hole 7 from the front side thereof. Then, the distal end portions of the outer frame-shaped portions 50, 50 are inserted into the mounting hole 7, and the engaging claws 65 are pressed against an inner circumference of the mounting hole 7 via the tapered surfaces 65a, whereby the pair of elastic engaging pieces 60, 60 are deflected inwards of the accommodating portion. When the engaging claws 65 reach the circumferential edge on the rear side of the mounting hole 7, the pair of elastic engaging pieces 60, 60 restore their normal states, and the engaging claws 65, 65 of the elastic engaging pieces 60, 60 are brought into engagement with the circumferential edge on the rear side of the mounting hole 7 in parallel with this, the pair of flange portions 25, 25 are brought into abutment with circumferential edge on the front side of the mounting hole 7, whereby the mounting device 10 is fixed in place in the mounting hole 7, as a result of which the vehicle part 1 can be mounted on the mount portion 5 via the mounting device 10 (refer to FIG. 7).

In the description made above, the mounting device 10 is inserted into the mounting hole 7 on the mount portion 5 to be fixed in place therein after the locking portion 3 is locked in the mounting device. However, a mounting process may be adopted in which at first, the mounting device 10 is inserted into the mounting hole 7 on the mount portion 5 to be fixed in place therein, whereafter the locking portion 3 is accommodated in the inner frame-shaped portion 30 of the mounting device 10 so that the mounting device 10 is locked on the locking portion 3, and hence, there is no specific limitation.

Then, when the vehicle part 1 is attempted to be removed from the mount portion 5 for reasons of repair, maintenance or replacement, as shown in FIG. 8, the operator grips on the gripping surfaces 69, 69 of the operation knobs 67, 67 so as to deflect the pair of elastic engaging pieces 60, 60 inwards of the accommodating portion. In this embodiment, the pair of elastic engaging pieces 60, 60 are deflected until they are brought into abutment with the pair of inner wall portions 33, 33 of the inner frame-shaped portion 30 (refer to FIG. 8). Then, the engaging claws 65, 65 which are provided on the elastic engaging pieces 60 are dislocated from the circumferential edge on the rear side of the mounting hole 7, whereby the engagement of the engaging claws 65 with the circumferential edge on the rear side of the mounting hole 7 can be released (refer to FIG. 8) then, the accommodating portion 20 of the mounting device 10 is pulled out of the mounting hole 7 as shown in FIG. 9 while keeping the released state, whereby the vehicle part 1 together with the mounting device 10 can be removed from the mounting hole 7 on the mount portion 5 while maintaining the state in which the locking portion 3 is left locked on the locking piece 37.

In addition, in this embodiment, the pair of elastic engaging pieces 60, 60 extend outwards from the pair of side wall portions (here, the outer wall portions 51, 51), and when they are deflected inwards of the accommodating portion 20, the pair of elastic engaging pieces 60, 60 are brought into abutment with the pair of side wall portions whereby any further deflection thereof is restricted. Thus, the amounts of deflection of the pair of elastic engaging pieces 60, 60 can be made uniform, and hence, the release of the engagement of the engaging claws 65 with the circumferential edge on the rear side of the mounting hole 7 can be executed in an ensured fashion, facilitating the removal of the mounting device 10 from the mounting hole 7.

Figure 9:
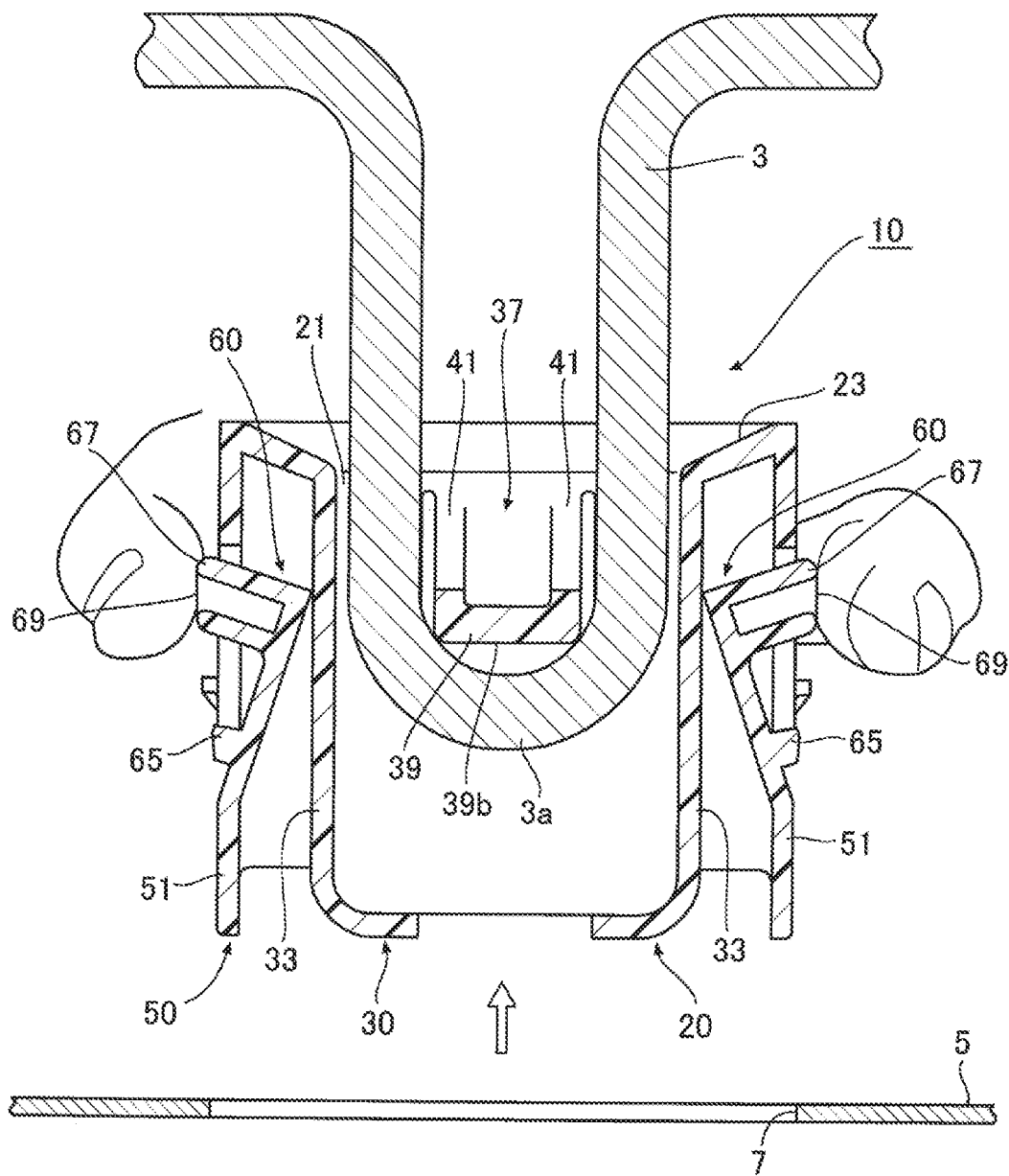
FIG. 9 is a sectional explanatory view showing a state where the vehicle part is removed from a mounting hole together with the part fixture.

To describe this more specifically, in this embodiment, as shown in FIG. 9, when the operation knobs 67, 67 are gripped on to deflect the pair of elastic engaging pieces 60, 60 inwards of the accommodating portion, the elastic engaging pieces 60, 60 are brought into abutment with the pair of inner wall portions 33, 33 of the inner frame-shaped portion 30 to thereby restrict any further deflection of the elastic engaging pieces 60, 60 therefore, when the accommodating portion 20 is pulled out of the mounting hole 7 by releasing the engagement of the engaging claws 65 with the circumferential edge on the rear side of the mounting hole 7, the locked state of the locking portion 3 on the locking piece 37 can be influenced in no way, whereby the vehicle part 1 together with the mounting device 10 can be removed from the mounting hole 7 on the mount portion 5 in an ensured fashion with the mounting device 10 left mounted on the vehicle part 1. In addition, since the mounts of deflection of the pair of elastic engaging pieces 60, 60 can be made uniform, the release of engagement of the engaging claws 65 with the circumferential edge on the rear side of the mounting hole 7 can be executed in an ensured fashion.

Further, when the operation knobs 67 are gripped on to deflect the elastic engaging pieces 60 in the way described above, since the operation knobs 67 are disposed apart from the circumferential edge on the front side of the mounting hole 7 with the predetermined space C provided therebetween as shown in FIG. 7, the operation knobs 67 can be gripped on easily, and the operation knobs 67 can be prevented from sliding on the mount portion 5 when the pair of elastic engaging pieces 60, 60 are deflected inwards of the accommodating portion, whereby the elastic engaging pieces 60 can easily be deflected by ensuring a relatively long distance between the engaging claws 65 and the operation knobs 67.

Additionally, as shown in FIG. 9, since the gripping surfaces 69 of the operation knobs 67 are formed into the inclined surfaces which expand diametrically away from each other as the gripping surfaces 69 extend in the direction in which they move away from the engaging claws 65, when attempting to grip on the operation knobs 67 by finding out the locations thereof without visually confirming them, the fingers of the operator can be easily guided to the operation knobs 67 so as to be easily caught thereon. Further, the elastic engaging pieces 60 can be easily deflected by the gripping surfaces 69. Even with the pair of elastic engaging pieces 60, 60 deflected maximum, the gripping surfaces 69, 69 of the operation knobs 67, 67 remain almost parallel to each other as shown in FIG. 9 or are inclined at a greater angle so as to form a reversely flared shape (an inclined shape which expands gradually diametrically as the gripping surfaces 69 extend in the direction in which they move away from the engaging claws 65) (refer to chain double-dashed lines in FIG. 8) thus, it becomes difficult for the fingers of the operator to slip on the gripping surfaces 69, thereby making it easy for the mounting device 10 to be pulled out of the mounting hole 7 in the mount portion 5.

Then, when attempting to remove the mounting device 10 itself from the locking portion 3 of the vehicle part 1, as shown in FIG. 10(a), the distal end portion 9a of the tool 9 is inserted into the inner frame-shaped portion 30 through the tool passage hole 45 which is formed in the wall portion 32 of the inner frame-shaped portion 30 and is brought into abutment with the recess portion 43 on the inner surface side of the locking piece 37 provided on the wall portion 31 so as to be disposed therein. Thereafter, the distal end portion 9a of the tool 9 is continuously pushed in. Then, as shown in FIG. 10(b), the locking piece 37 is pushed on by the distal end portion 9a of the tool 9 and is deflected to be deformed outwards of the accommodating portion, whereby the mounting device 10 is pulled to be removed from the locking portion 3 in such a way that the tapered surface 39a of the locking claw 39 slides on an inner surface of the bent portion 3a of the locking portion 3. Then, when the locking piece 37 is pushed in until the tapered surface 39a of the locking claw 39 is brought into abutment with an outer surface of the bent portion 3a of the locking portion 3, the locking piece 37 is prevented from restoring elastically its normal state (refer to FIG. 10(b)), whereafter, as shown in FIG. 10(c), the locking portion 3 is lifted up from the inner frame-shaped portion 30 so as to be pulled out of the opening portion 21, whereby the mounting device 10 can be removed from the locking portion 3.

Consequently, in this mounting device 10, the mounting device 10 can be removed from the locking portion 3 of the vehicle part 1 by releasing the engagement of the locking piece 37 with the locking portion 3 by making use of the tool passage hole 45 which constitutes the locking releasing means, so that the mounting device 10 can be used again.

In this embodiment, since the locking releasing means for releasing the locking of the locking piece 37 on the locking portion 3 is, as described above, made up of the tool passage hole 45 formed in the wall portion 32 of the inner frame-shaped portion 30 which faces the wall portion 31 thereof on which the locking piece 37 is provided so as to allow the distal end portion 9a of the tool 9 to be inserted therethrough, the locking of the locking piece 37 on the locking portion 3 can be smoothly released by the simple operation of only deflecting to deform the locking piece 37 outwards of the accommodating portion as described above by inserting the distal end portion 9a of the tool 9 through the tool passage hole 45, thereby facilitating the removal of the mounting device 10 from the locking portion 3.

Further, in this mounting device 10, the locking piece 37 which is locked on the locking portion 3 of the vehicle part 1 and the elastic engaging pieces 60 having the engaging claws 65 which are brought into engagement with the mounting hole 7 on the mount portion 5 are provided to extend from the inner wall portion 33 of the inner frame-shaped portion 30 and the outer wall portions 51 of the outer frame-shaped portions 50, respectively, which make up the accommodating portion 20 and hence are formed integrally on the accommodating portion 20 thus, the number of parts involved can be reduced, thereby making it possible to reduce the production cost.

Figure 11:
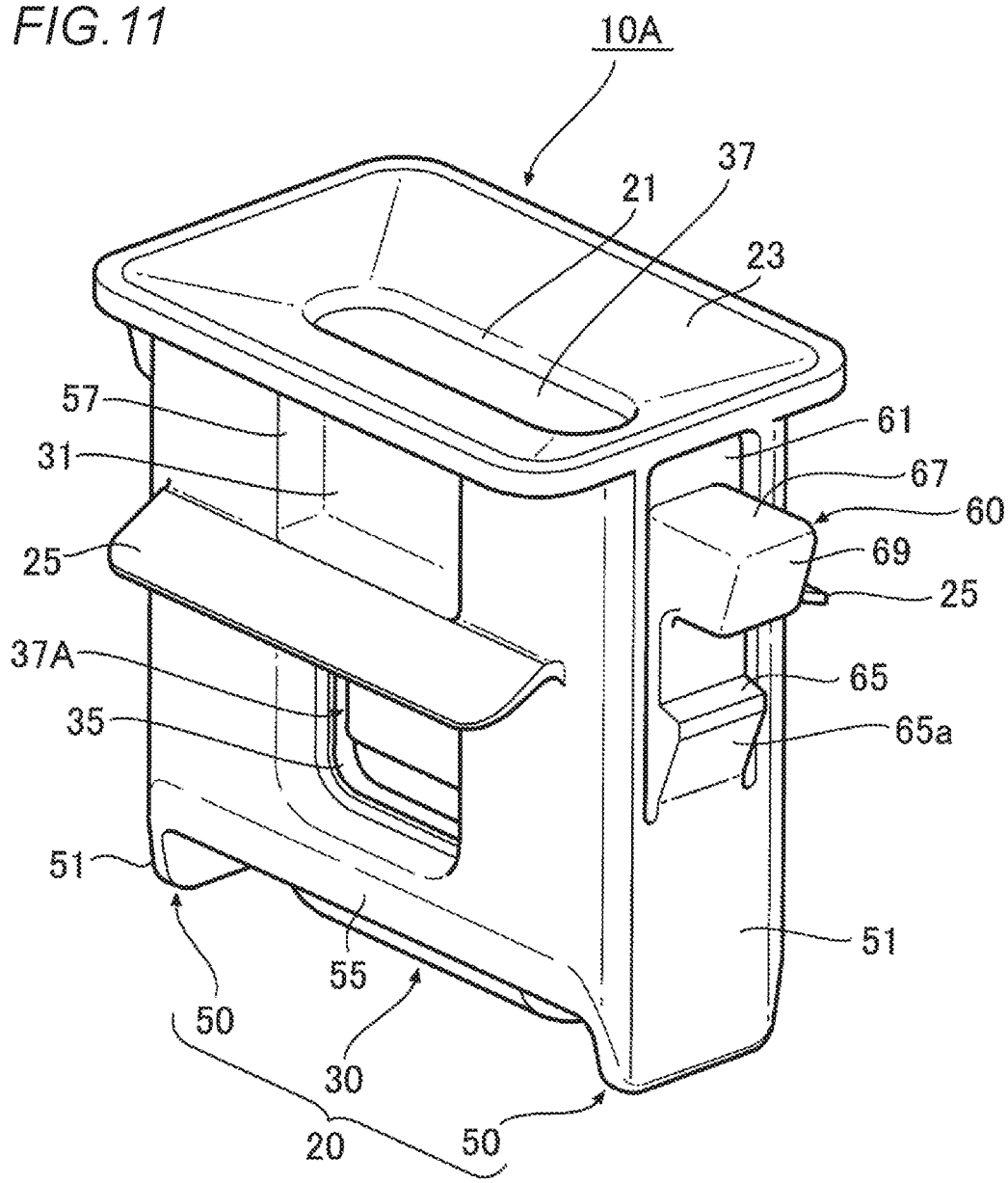
FIG. 11 is a perspective view showing another embodiment of a part fixture the invention.
Figure 12:
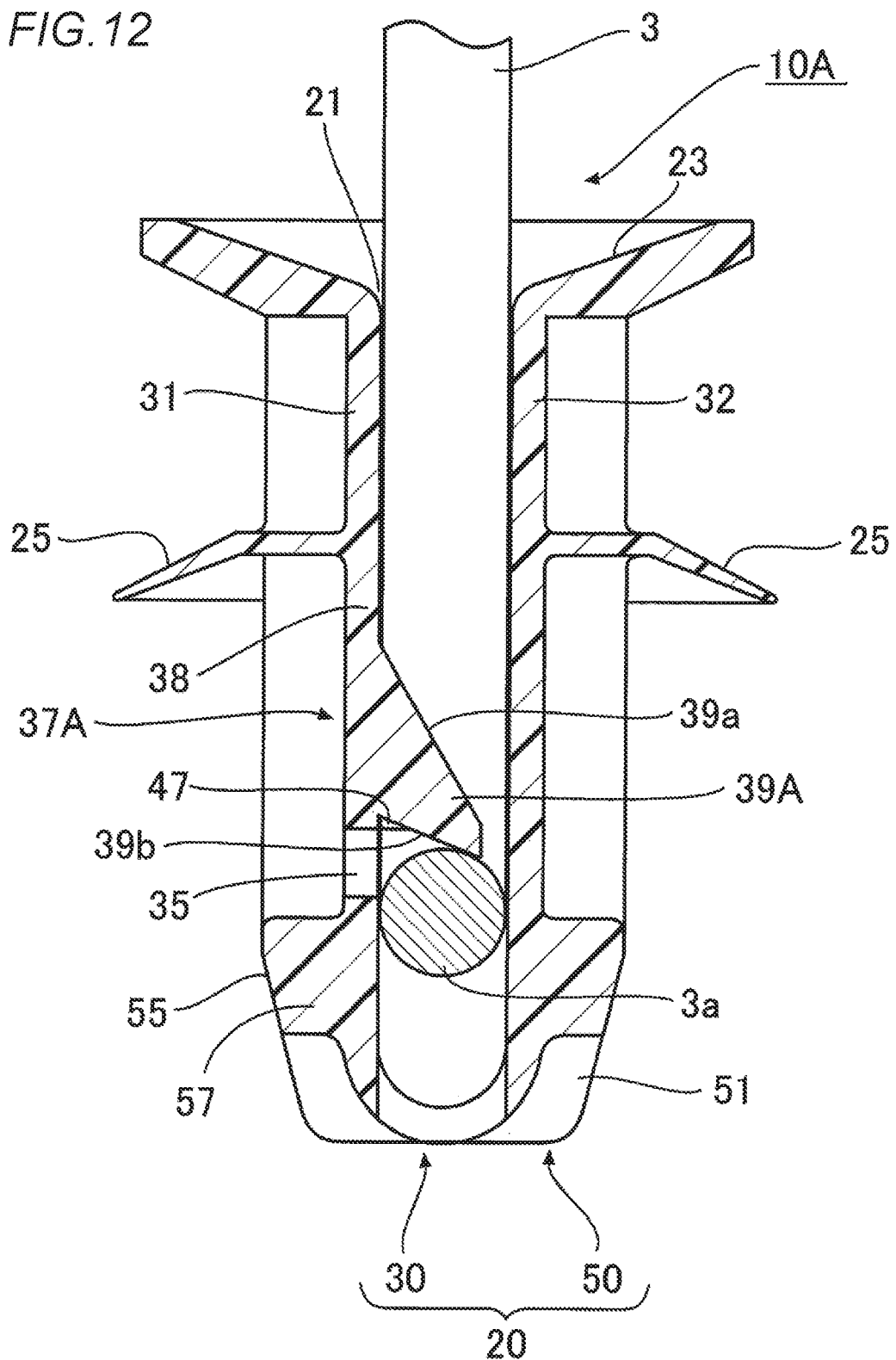
FIG. 12 is a vertical sectional view of the part fixture.

Another embodiment of a part fixture of the invention is shown in FIGS. 11 to 13. It is noted that like reference numerals will be given to substantially like portions to those of the embodiment described above, and the description thereof will be omitted here.

A part fixture 10A (hereinafter, referred to simply as a "mounting device 10A") of this embodiment differs from the mounting device 10 of the embodiment described above in a locking releasing means for releasing the locking of a locking piece 37 and a locking portion 3.

As shown in FIG. 11, in the mounting device 10A, flange portions 25 are provided to extend from positions which lie closer to an opening portion 21 than the positions on the mounting device 10 where the flange portions 25 are provided. Additionally, as shown in FIG. 12, a locking portion 37A is formed via a slit 35 so as to be deflected on an inner wall portion 33 of an inner frame-shaped portion 30 in a position which lies closer to a distal end portion of an accommodating portion 20 than the flange portion 25 (a position which lies on a side opposite to a side which faces the opening portion 21). This locking piece 37A is made up of a strap-shaped piece 38 and a locking claw 39A which is provided on an inner surface side of the strap-shaped piece 38 so as to project inwards of the accommodating portion. A tapered surface 39a is formed on a side thereof which lies to face the opening portion 21 in the same way as the way in which the locking claw 39 is formed in the embodiment described above, and a reversely tapered surface 39b is formed on an opposite side to the side where the locking claw 39A is formed. Then, a groove portion 47, in which a distal end portion 9a of a tool 9 can be locked, is formed at a proximal end portion of the locking claw 39A on a side thereof which lies opposite to the side which faces the opening portion 21 (refer to FIG. 12). The distal end portion 9a of the tool 9 can be passed through the slid 35 from the outside of the accommodating portion 20 to be locked in the groove portion 47 (refer to FIG. 13). This groove portion 47 constitutes the "locking releasing means" for releasing the locking of the locking piece on the locking portion according to the invention.

Then, in this mounting device 10A, in releasing the locking of the locking piece 37A on a locking portion 3 of a vehicle part 1, firstly, as shown in FIG. 13(a), the distal end portion 9a of the tool 9 is inserted from the slit 35 formed in the wall portion 31, so that the distal end portion 9a is locked in the groove portion 47 of the locking claw 39A. Thereafter, as shown in FIG. 13(b), the distal end portion 9a of the tool 9 is placed on a distal end wall portion 55 which connects outer frame-shaped portions 50, 50 together. Then, the distal end portion 9a of the tool 9 is operated like a lever which operates on the distal end wall portion 55 as a fulcrum to prize the locking piece 37A in such a way that the locking piece 37A is deflected to be deformed outwards of the accommodating portion, whereby the locking claw 39 is dislocated from an inside of a bent portion 3a of the locking portion 3 via the tapered surface 39a to release the locked state of the locking portion 3 with the locking claw 39A, thereby making it possible to remove the mounting device 10A smoothly from the locking portion 3.

A further embodiment of a part fixture of the invention is shown in FIGS. 14 to 21. It is noted that like reference numerals will be given to substantially like portions to those of the embodiment described above, and the description thereof will be omitted here.

A part fixture 10B (hereinafter, referred to simply as a "mounting device 10B") of this embodiment differs from those of the embodiments described above in construction of an accommodating portion and elastic engaging pieces.

As shown in FIGS. 14 to 17, and 21, an accommodating portion 20B of this mounting device 10B differs from those of the embodiments described above in construction, and the accommodating portion 20B of the mounting device 10B has a single wall (one wall) construction, whereas those of the embodiments described above have the double wall construction. Namely, this accommodating portion 20B is formed into the shape of a frame which is made up of a pair of front and rear wall portions 26, 26 (refer to FIG. 21) which are disposed so as to face each other in parallel along a longitudinal direction of an opening portion 21 and on which flange portions 25 are disposed and a pair of left and right side wall portions 27, 27 which are disposed so as to intersect with a direction in which the pair of wall portions 26, 26 are disposed so as to face each other and which connect both ends of the pair of wall portions 26, 26 together without outer walls which surround the wall portions, and hence, the accommodating portion 20B has a single wall construction.

Figure 14:
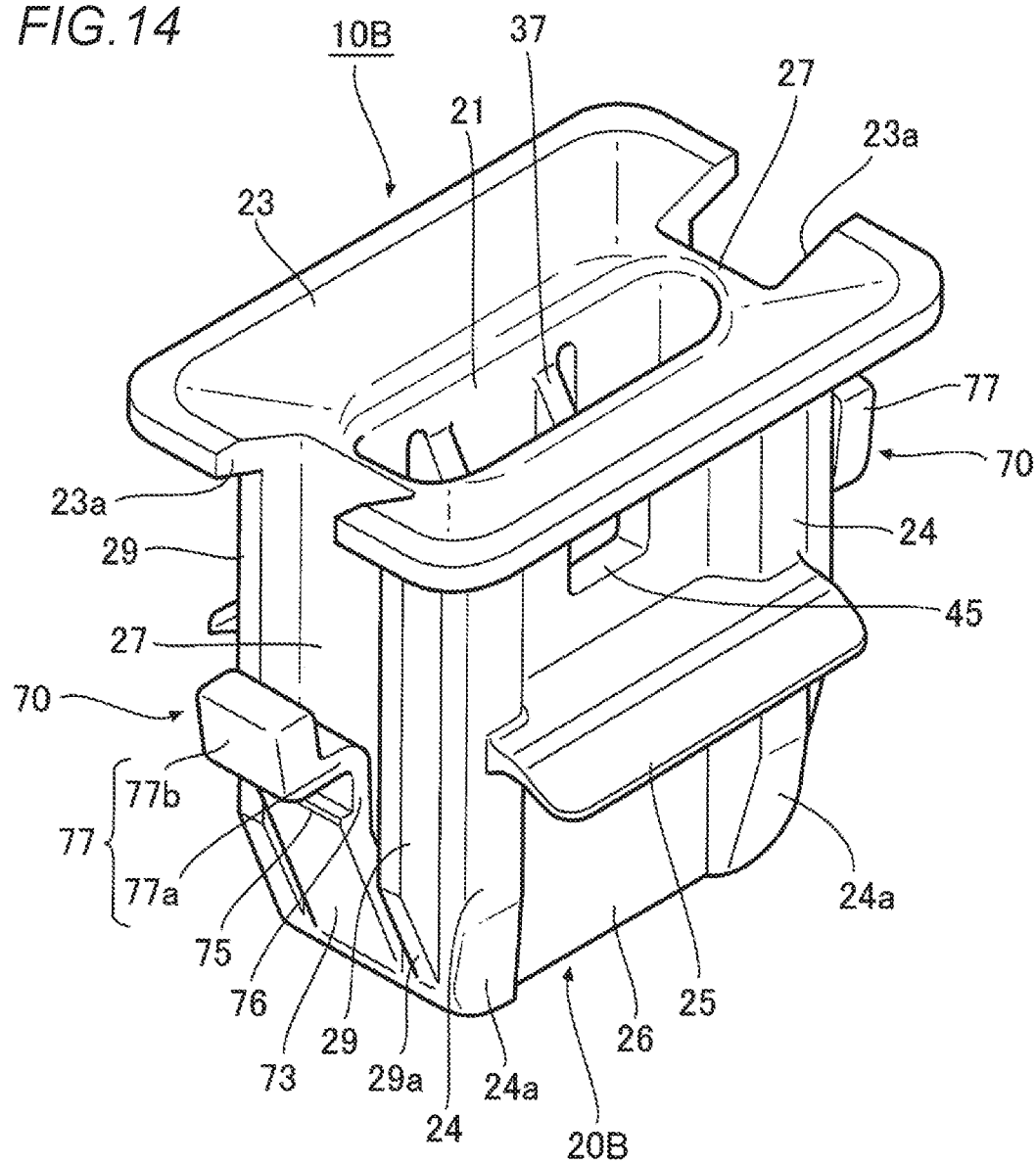
FIG. 14 is a perspective view showing a further embodiment of a part fixture of the invention.
Figure 15:
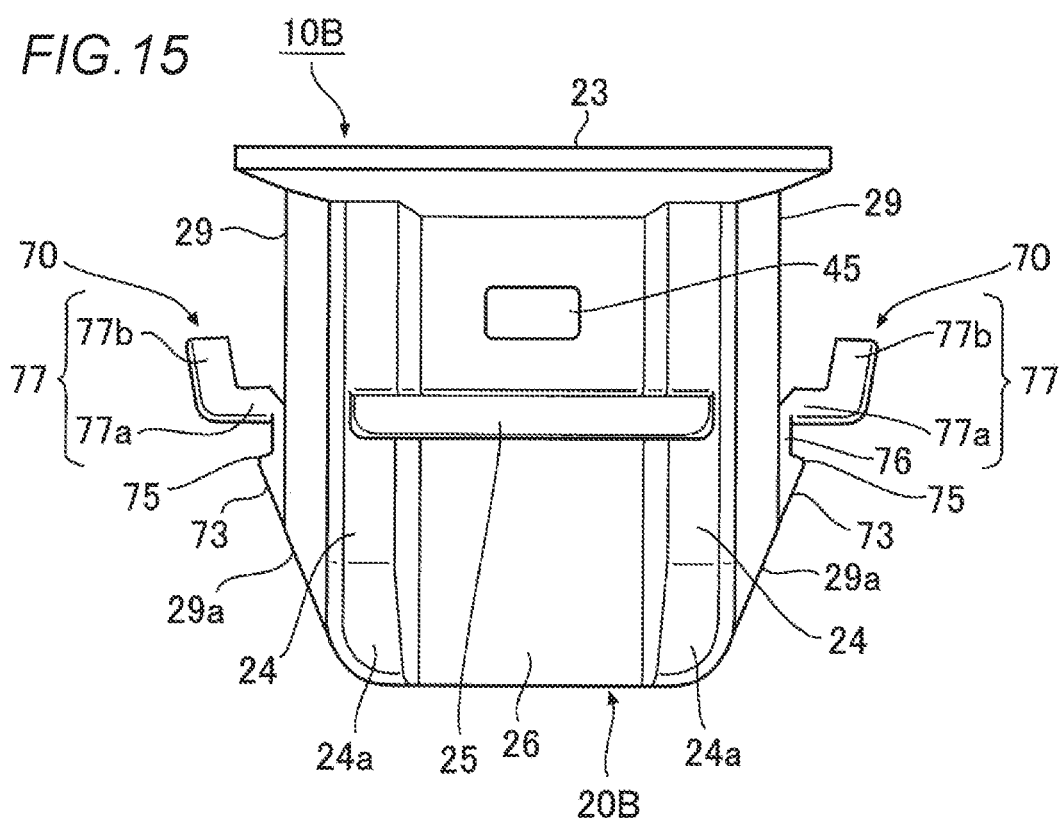
FIG. 15 is a front view of the part fixture.
Figure 21:
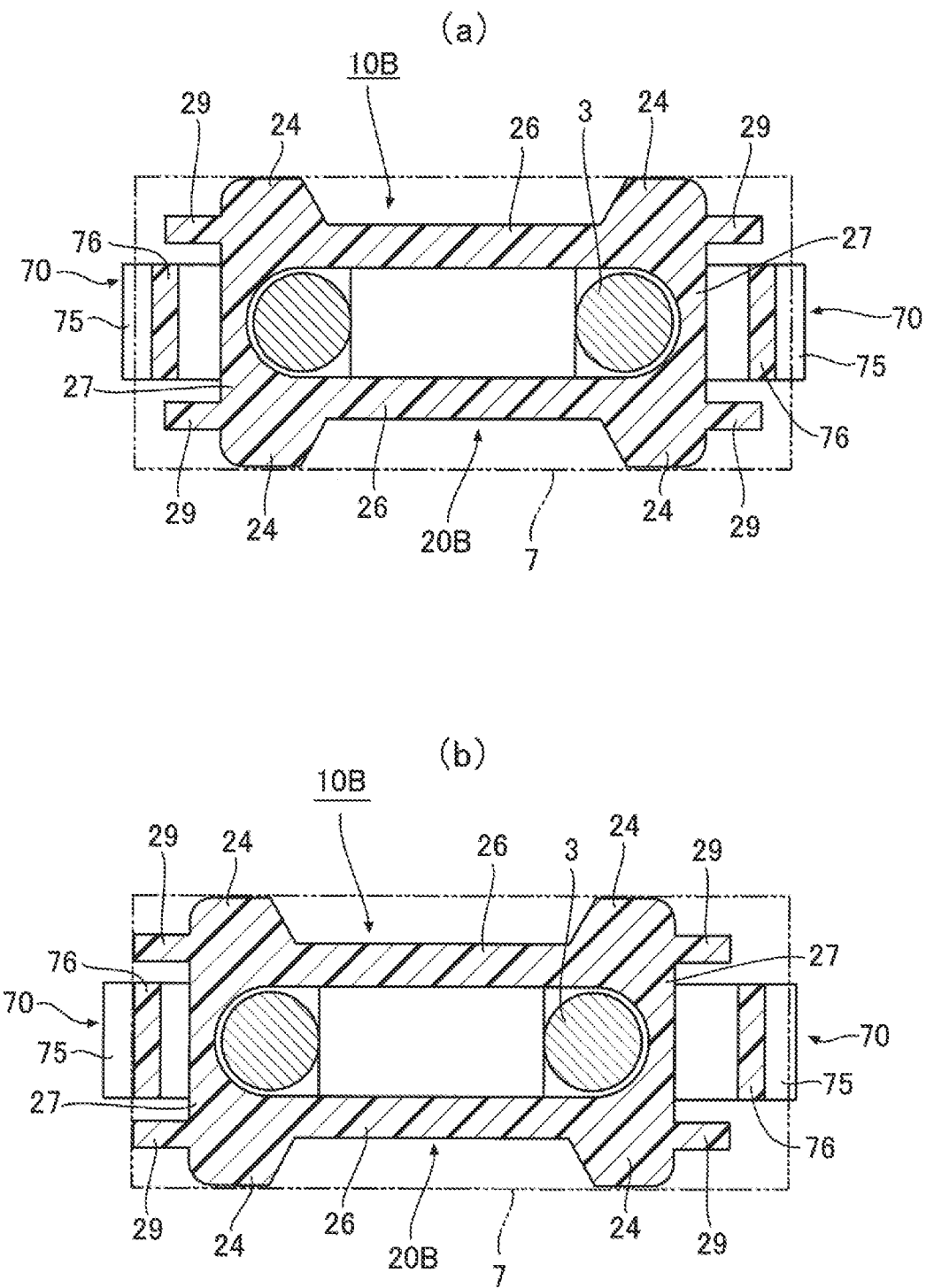
FIG. 21(a) is a horizontal sectional view showing a state where the part fixture is mounted in a mounting hole.
FIG. 21(b) is a horizontal sectional view showing a state where a horizontal load is exerted on the part fixture which is in the state shown in FIG. 21(a).

Additionally, as shown in FIGS. 14 and 21, abutment portions 24, which are elongated projections of a predetermined width, extending along an axial direction of the accommodating portion 20B, are provided on outer surfaces of longitudinal side portions of each of the wall portions 26 so as to project therefrom. With the accommodating portion 20B inserted in a mounting hole 7, these abutment portions 24 are in abutment with an inner circumference of the mounting hole 7 so as to suppress a rattling looseness of the accommodating portion 20B. As shown in FIG. 14, tapered surfaces 24a are formed on outer surfaces of the abutment portions 24 at distal end sides thereof in relation to an inserting direction of the accommodating portion 20B into the mounting hole 7, and these tapered surfaces 24a are inclined so as to become gradually higher from distal end sides, which are low in height, towards proximal end sides thereof in relation to the inserting direction, thereby making it possible to ensure the ease with which the accommodating portion 20B is inserted into the mounting hole 7.

Figure 17:
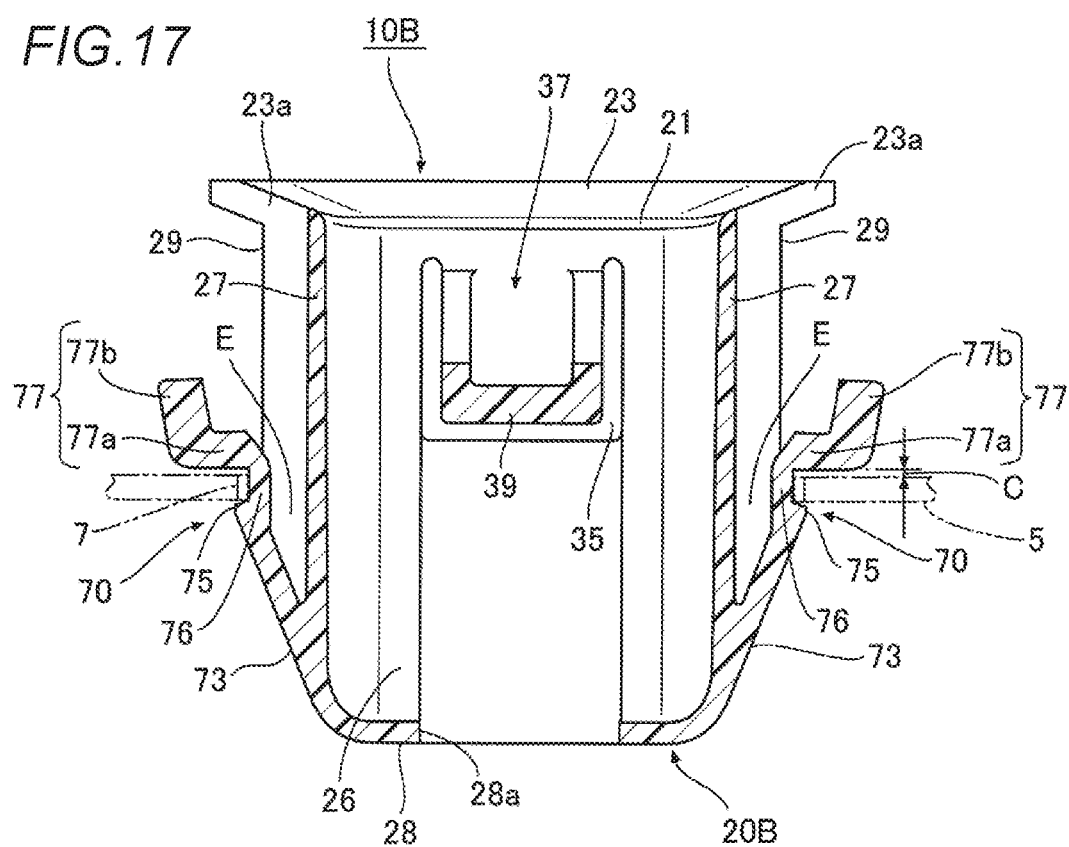
FIG. 17 is a sectional view of the part fixture.

Further, a bottom wall 28 having a cut-out hole 28a which is formed in a center thereof is disposed at the distal end side of the accommodating portion 20B in relation to the inserting direction thereof into the mounting hole 7 (refer to FIG. 17). In addition, the locking piece 37 is provided on one of the wall portions 26 of the accommodating portion 20B so as to extend therefrom, and the tool passage hole 45 is formed in the other of the wall portions 26 of the accommodating portion 20B.

A pair of elastic engaging pieces 70, 70, which can be deflected, are provided on the pair of side wall portions 27, 27 so as to extend outwards therefrom. Then, when the pair of elastic engaging pieces 70, 70 are deflected inwards of the accommodating portion 20B, the elastic engaging pieces 70, 70 are brought into abutment with the corresponding side wall portions 27, 27, whereby any further deflection thereof is restricted.

Each elastic engaging piece 70 is provided on an outer surface side of the side wall portion 27 at a distal end side thereof in relation to the inserting direction of the accommodating portion 20B into the mounting hole 7 so as to extend therefrom obliquely outwards towards a proximal end side thereof in relation to the inserting direction to thereby a space E between an outer surface of the side wall portion 27 and itself (refer to FIGS. 14 and 17).

To describe this more specifically, each elastic engaging piece 70 of this embodiment has, as shown in FIG. 17, an inclined portion 73 which extends obliquely outwards from the outer surface at the distal end side of the side wall portion 27, an engaging claw 75 which is provided on an outer surface of the inclined portion 73 in a halfway position in relation to an extending direction of the inclined portion 73 and which is brought into engagement with a circumferential edge on a rear side of the mounting hole 7, an inserting portion 76 which extends almost parallel to the side wall portion 27 from a base portion side of the inclined portion 73 and which is inserted into an inner circumference of the mounting hole 7 to be disposed therein, and an operation knob 77 which is provided so as to continue to an outside of the inserting portion 76 and which deflects the elastic engaging piece 70 inwards of the accommodating portion. The operation knob 77 has a base portion 77a which is disposed above a circumferential edge on a front side of the mounting hole 7 with a predetermined gap C provided therebetween in such a state that the engaging claw 75 is in engagement with the circumferential edge on the rear side of the mounting hole 7 and the mounting device 10B is fixed in place in the mounting hole 7 and a projecting portion 77b which projects a predetermined height from one end portion of the base portion 77a towards a side of the accommodating portion 20 which lies to face the opening portion 21 thereof, and when seen from a side, the operation knob 77 has substantially an L-like shape. Gripping surfaces 69 like those of the embodiments described above are provided on outer surfaces of the operation knobs 77.

Figure 20:
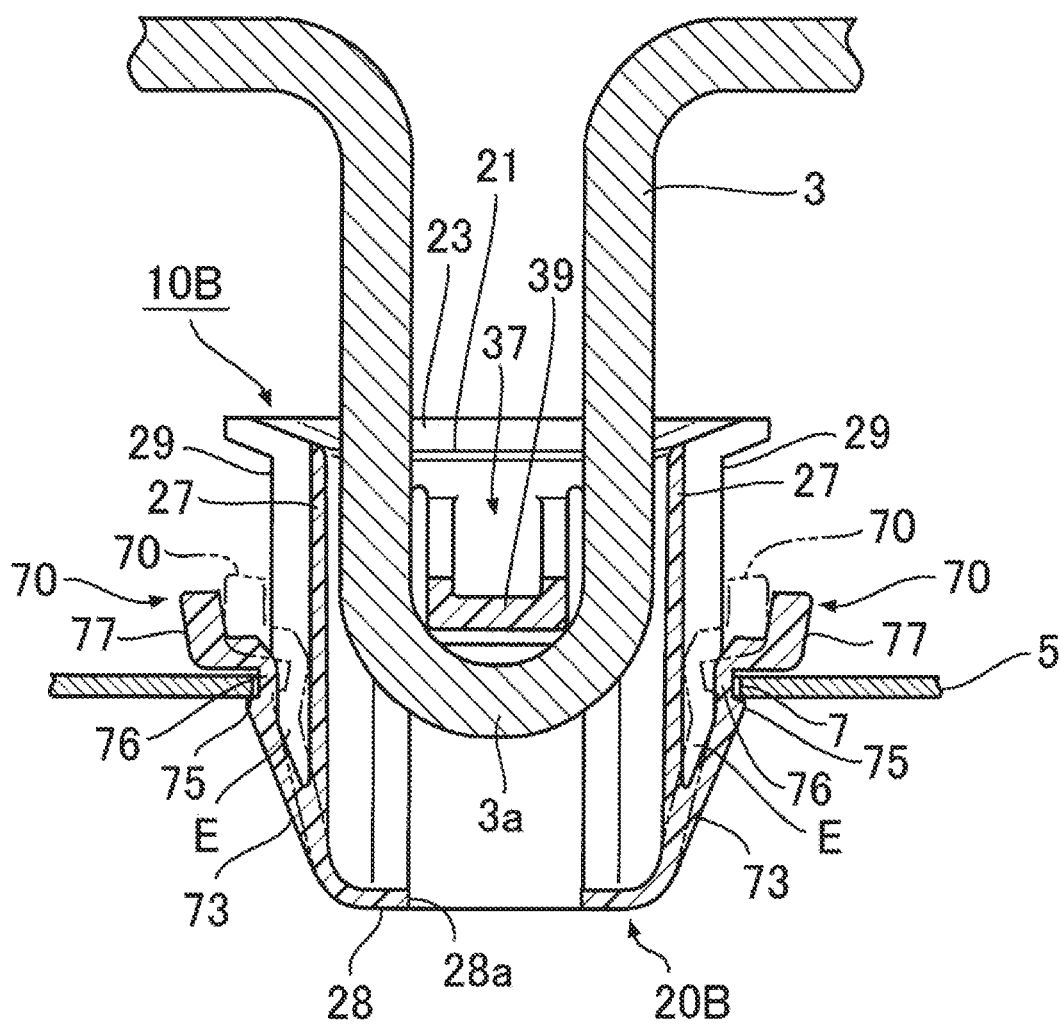
FIG. 20 is a sectional explanatory view showing a state in which the vehicle part is mounted on the mount portion via the locking portion using the part fixture.

Then, as indicated by phantom lines in FIG. 20, when the pair of elastic engaging pieces 70, 70 are deflected maximum towards an interior of the accommodating portion, the elastic engaging pieces 70, 70 are brought into abutment with the corresponding side wall portions 27, 27 of the accommodating portion 20B, so that any further deflection of the pair of elastic engaging pieces 70, 70 is restricted.

Additionally, ribs 29 are formed on both sides (both transverse sides of the side wall portion 27) of the elastic engaging piece 70 on the outer surface side of each of the side wall portions 27 of the accommodating portion 20B so as to extend along an axial direction of the accommodating portion 20B. Each rib 29 has a tapered portion which diminishes in thickness towards a distal end side thereof in relation to the inserting direction of the accommodating portion 20B into the mounting hole 7. Here, a tapered portion 29a which diminishes in thickness towards its end is provided on an outer surface of a distal end portion of each rib 29 in relation to the inserting direction of the accommodating portion 20B into the mounting hole 7.

Figure 16:
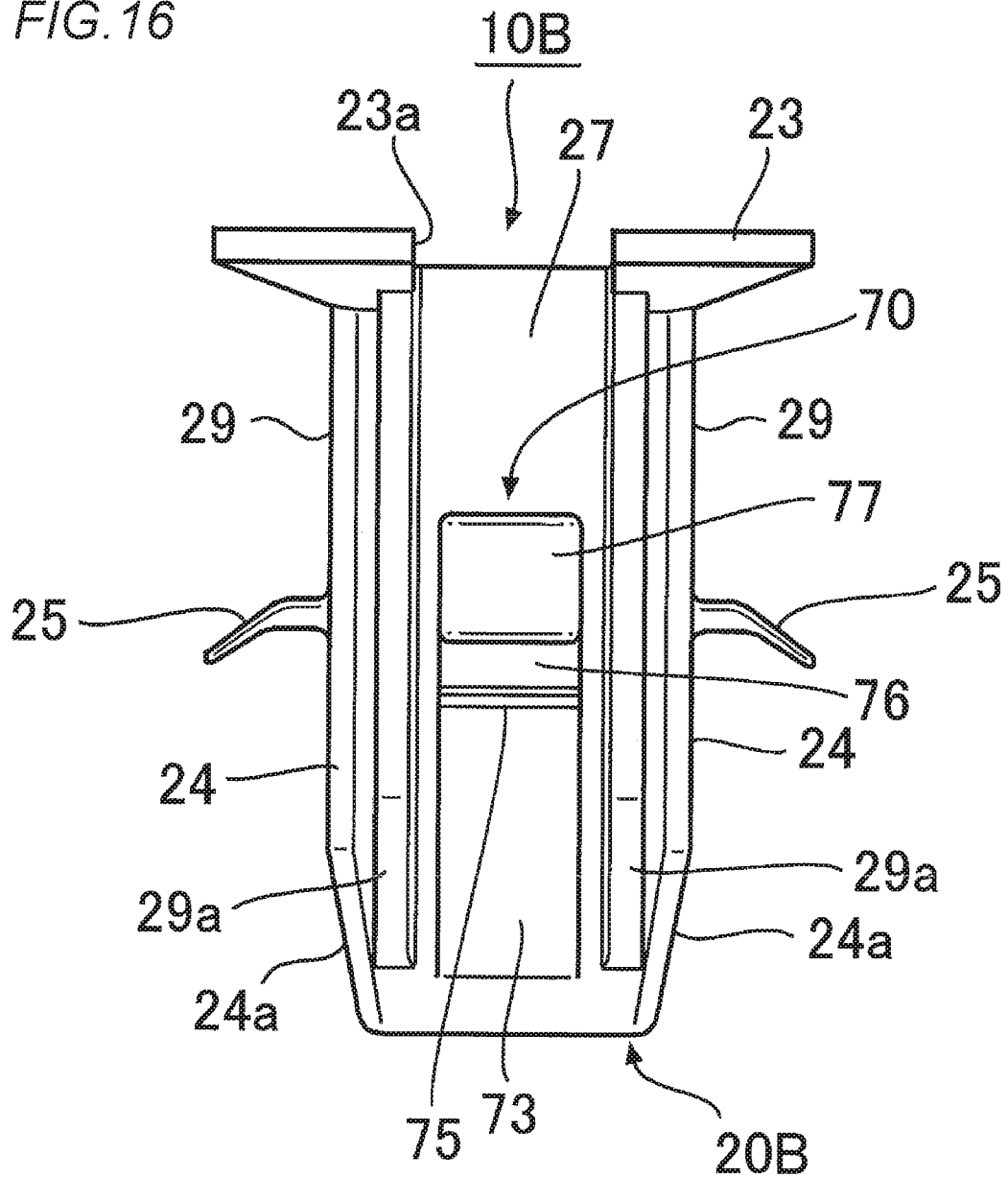
FIG. 16 is a side view of the part fixture.

Further, as shown in FIGS. 14 and 16, cut-outs 23a, 23a are formed in a guide portion 23, which expands into a flange-like shape, of the accommodating portion 20B at locations which match the pairs of ribs 29, 29 which are provided on both the sides of the elastic engaging pieces 70. The ribs 29 are connected to circumferential edges on rear sides of the cut-outs 23a at their proximal end portions. A space E surrounded by the side wall portion 27 of the accommodating portion 20B, the elastic engaging piece 70 which is provided outside the side wall portion 27, and the pair of ribs 29, 29 which are provided on the sides of the elastic engaging piece 70 communicates the cut-out 23 (refer to FIG. 17).

Additionally, the pairs of ribs 29, 29 provided on both the sides of the elastic engaging pieces 70 are configured so that when an eccentric load is exerted on the accommodating portion 20B in a direction in which one of the elastic engaging pieces 70 is deflected inwards in such a state that the accommodating portion 20B is inserted in the mounting hole 7 and that the engaging claws 75, 75 of the pair of elastic engaging pieces 70, 70 are individually in engagement with the circumferential edge on the rear side of the mounting hole 7 as shown in FIG. 21(a), the pair of ribs 29, 29 which are provided on both the sides of one of the elastic engaging pieces 70 are brought into abutment with an inner circumference of the mounting hole 7 as shown in FIG. 21(b) before the other elastic engaging piece 70 is released from the engagement with the circumferential edge on the rear side of the mounting hole 7.

When used herein, "eccentric" means that a position of the accommodating portion 20B which is aligned with a center of the mounting hole (normally, a central position of the accommodating portion 20) in such a state that the engaging claws 75, 75 of the pair of elastic engaging pieces 70, 70 are in engagement with the circumferential edge on the rear side of the mounting hole 7 deviates from the center of the mounting hole (to describe this more simply, the center of the accommodating portion deviates from the center of the mounting hole).

Additionally, when used herein, the "eccentric load" means an unexpected external force or impact force such as a load exerted when the center of the accommodating portion is caused to deviate from the center of the mounting hole, for example, a lateral load which is imparted to the accommodating portion 20B in a direction which follows a surface direction of the mount portion 5 or an oblique load which is imparted obliquely to the center of the mounting hole.

Next, the working effect of the mounting device 10B which is constructed in the way described above will be described.

Figure 18:
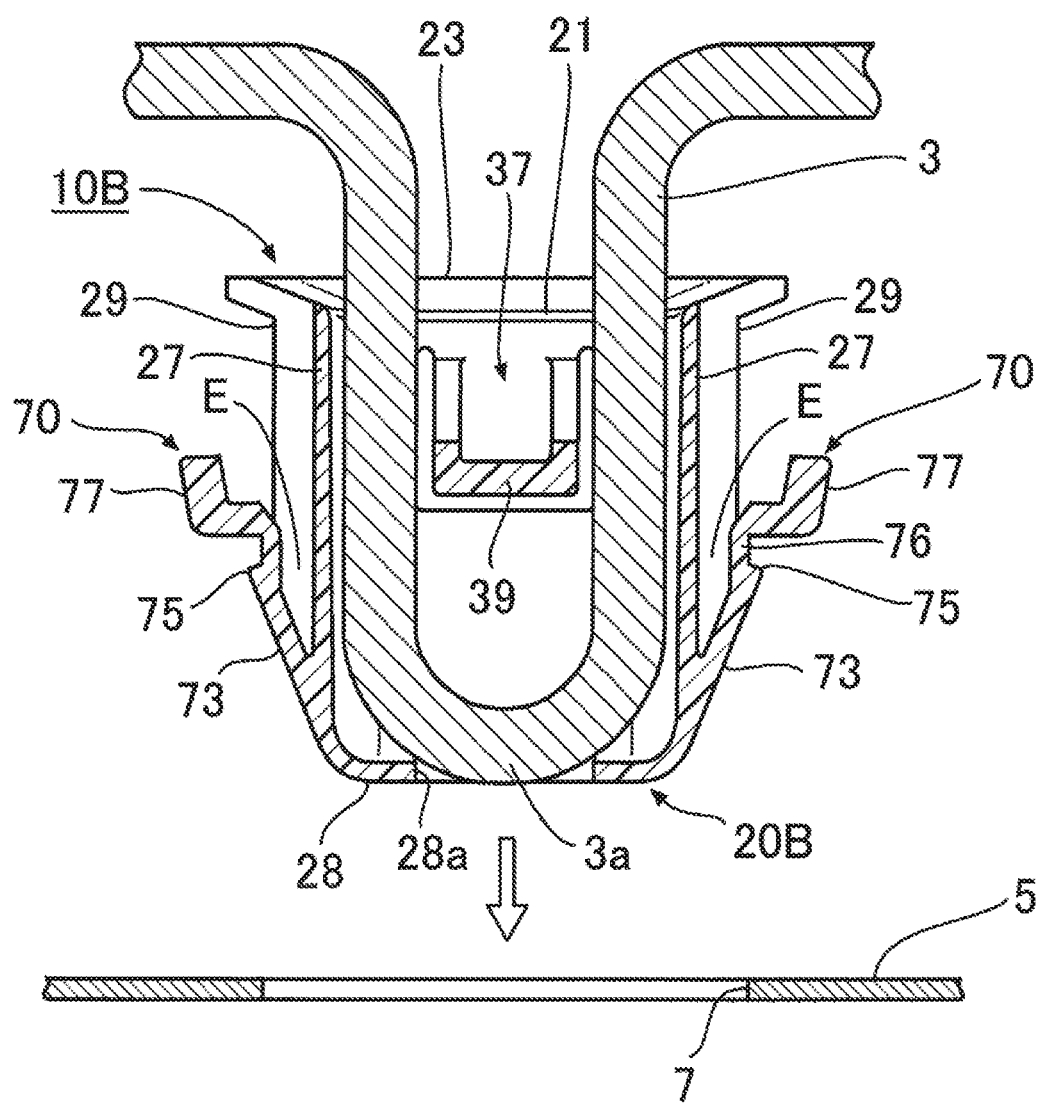
FIG. 18 is an explanatory view showing a mounting process of the part fixture.

Namely, as shown in FIG. 18, the locking portion 3 of the vehicle part 1 is inserted into the opening portion 21 of the accommodating portion 20B of the mounting device 10B, and a locking claw 39 of the locking piece 37 is locked on the locking portion 3 then, the accommodating portion 20B is continuously inserted into the mounting hole 7 after the mounting device 10B is mounted on the locking portion 3 so as not to be dislocated therefrom. It should be noted that the locking claw 39 of the engaging piece 37 is disengaged from the locking portion 3 when the accommodating portion 20B is inserted into the mounting hole 7. Then, the accommodating portion 20B is continuously inserted into the mounting hole 7 while being guided by the tapered surfaces 24a of the abutment portions 24, the tapered portions 29a of the ribs 29 and the inclined portions 73, 73 of the pair of elastic engaging pieces 70, 70 of the accommodating portion 20B with the pair of elastic engaging pieces 70, 70 being deflected inwards as a result of being pressed against by the inner circumference of the mounting hole 7. Thereafter, when the respective engaging claws 75 of the elastic engaging pieces 70 reach the circumferential edge on the rear side of the mounting hole 7, the pair of elastic engaging pieces 70, 70 elastically restore the normal states thereof, and the engaging claws 75, 75 are brought into engagement with the circumferential edge on the rear side of the mounting hole 7 then, the pair of flange portions 25, 25 are brought into abutment with the circumferential edge on the front side of the mounting hole 7, whereby the mounting device 10B is fixed in place in the mounting hole 7, thereby making it possible for the vehicle part 1 to be mounted on the mount portion 5 via the mounting device 10B (refer to FIG. 20).

As this occurs, in this embodiment, since the pair of elastic engaging pieces 70, 70 are individually provided on the side wall portions 27, 27 of the accommodating portion 20B so as to extend obliquely outwards from the distal end sides of the side wall portions 27, 27 of the accommodating portion 20B in relation to the inserting direction of the accommodating portion 20B into the mounting hole 7 towards the proximal end sides thereof in relation to the inserting direction, when the accommodating portion 20B is continuously inserted into the mounting hole 7, the pair of elastic engaging pieces 70, 70 function to guide the insertion of the accommodating portion 20B, and the elastic engaging pieces 70 are gradually pressed against by the inner circumference of the mounting hole to contract diametrically, this facilitating the insertion of the accommodating portion 20B into the mounting hole 7.

In addition, in this embodiment, since the ribs 29, 29 are formed on the sides of the elastic engaging pieces 70 which are provided on the side wall portions 27 of the accommodating portion 20B and the ribs 29 have the tapered portions 29a which diminish in thickness towards the distal ends thereof in relation to the inserting direction of the accommodating portion 20B into the mounting hole 7, as described above, when the accommodating portion 20B is continuously inserted into the mounting hole 7, the accommodating portion 20B is easily inserted into the mounting hole 7, and the ribs 29 are brought into abutment with the inner circumference of the mounting hole 7 so as to guide the insertion of the accommodating portion 20B into the mounting hole 7, thereby making it possible to enhance the ease with which the accommodating portion 20B is inserted into the mounting hole 7.

Figure 19:
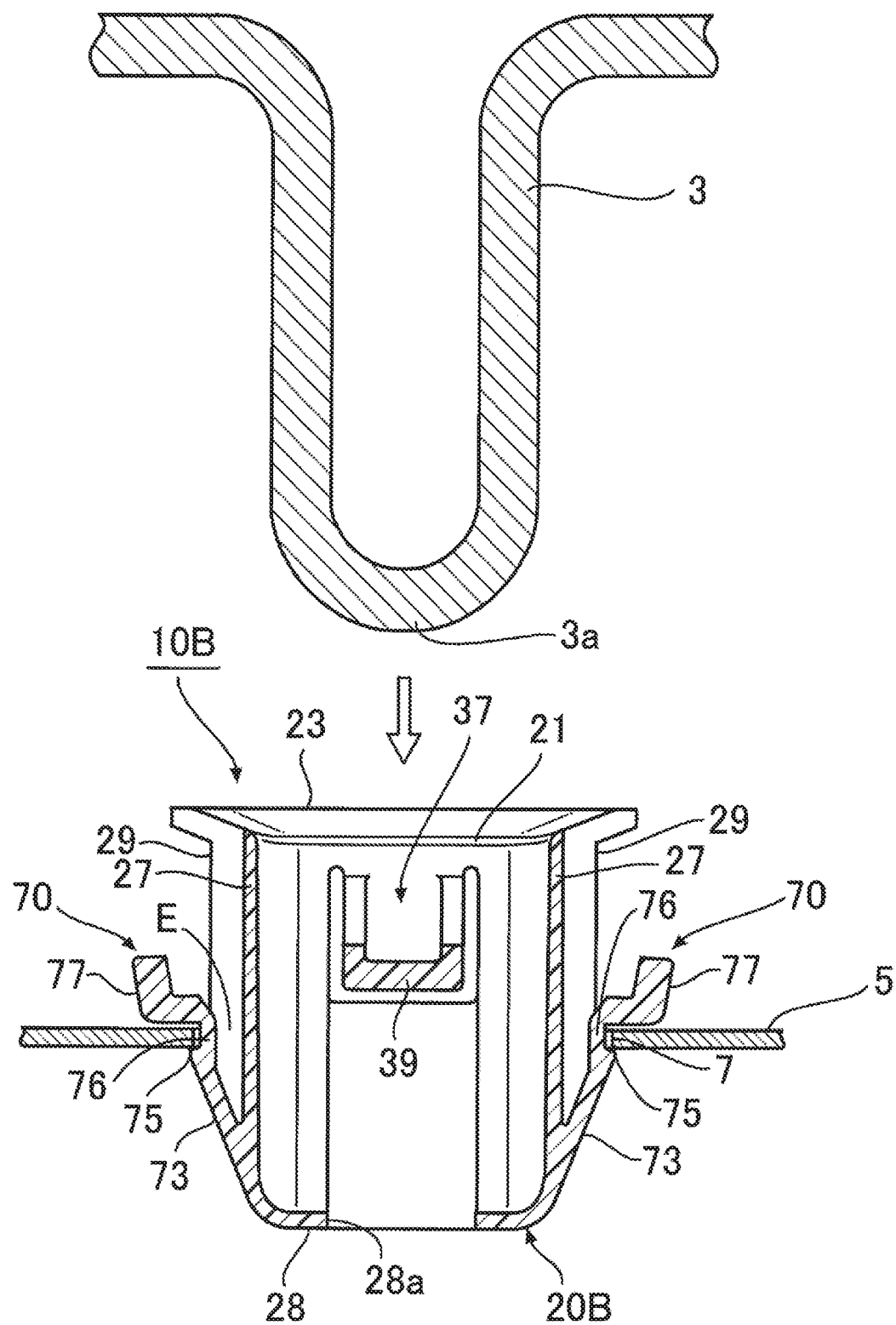
FIG. 19 is an explanatory view showing a different mounting process of the part fixture which differs from the mounting process shown in FIG. 17.

Incidentally, in this mounting device 10B, the vehicle part 1 can also be mounted on the mount portion 5 via the mounting device 10B by, as shown in FIG. 19, inserting the locking portion 3 of the vehicle part 1 into the opening portion 21 of the accommodating portion 20B of the mounting device 10B and locking the mounting device 10B on the locking portion 3 via the locking claw 39 after the mounting device 10B is inserted into the mounting hole 7 and is fixed in place therein.

Namely, in this embodiment, the accommodating portion 20B can be inserted into the mounting hole 7 after the locking portion 3 of the vehicle part 1 is inserted into the accommodating portion 20B and is locked therein (refer to FIG. 18), and the locking portion 3 of the vehicle part 1 can also be inserted into the accommodating portion 20B after the accommodating portion 20B is inserted into the mounting hole 7 and is fixed in place therein (refer to FIG. 19) thus, the mounting performance of the mounting device 10B in the mounting hole 7 can be enhanced.

Then, in this embodiment, since the pair of elastic engaging pieces 70, 70 which extend from the pair of side wall portions 27, 27 of the accommodating portion 20B are brought into abutment with the pair of side wall portions 27, 27 when the pair of elastic engaging pieces 70, 70 are deflected inwards of the accommodating portion, the side wall portions 27, 27 of the accommodating portion 20B can have the single wall (one wall) construction, thereby making it possible to make the mounting device 10B compact in size.

Incidentally, in the mounting device 10, the pair of ribs 29, 29 which are provided on both the sides of each elastic engaging piece 70 are disposed so as to face inner circumferences of shorter sides of the mounting hole 7 which has the elongated hole shape as shown in FIG. 21(a) in such a state that the accommodating portion 20B is inserted in the mounting hole 7 and the engaging claws 75, 75 of the pair of elastic engaging pieces 70, 70 are in engagement with the circumferential edge on the rear side of the mounting hole 7. In this state, the plurality of abutment portions 24 which are provided on the accommodating portion 20B are in abutment with inner circumferences of longer sides of the mounting hole 7.

In this state, when a load (for example, a lateral load directed along the surface direction of the mount portion 5 or an oblique load which causes the accommodating portion 20B to shift its position, although it is not directed along the surface direction of the mount portion 5) is exerted in a direction in which the accommodating portion 20B is caused to shift its position from the predetermined mounting position (refer to FIGS. 20 and 21), causing an eccentric load to be exerted on the accommodating portion 20B in such a direction that one of the elastic engaging pieces 70 is deflected inwards, the pair of ribs 29, 29 of the one of the elastic engaging pieces 70 are brought into abutment with the inner circumference of the shorter side of the mounting hole 7 before the engaging claw 75 of the other of the elastic engaging pieces 70 is released from the engagement with the circumferential edge on the rear side of the mounting hole 7 as shown in FIG. 21(b). As a result of this, since the accommodating portion 20B is restricted from shifting its position any further, any further deflection of the one of the elastic engaging pieces 70 is restricted to thereby prevent a disengagement of the engaging claw 75 of the same elastic engaging piece 70 from the circumferential edge on the rear side of the mounting hole 7, and it is also possible to prevent a disengagement of the engaging claw 75 of the other elastic engaging piece 70 from the circumferential edge on the rear side of the mounting hole 7, thereby making it possible to prevent a disengagement of the mounting device 10 from the mounting hole 7 in an ensured fashion.

Figure 22:
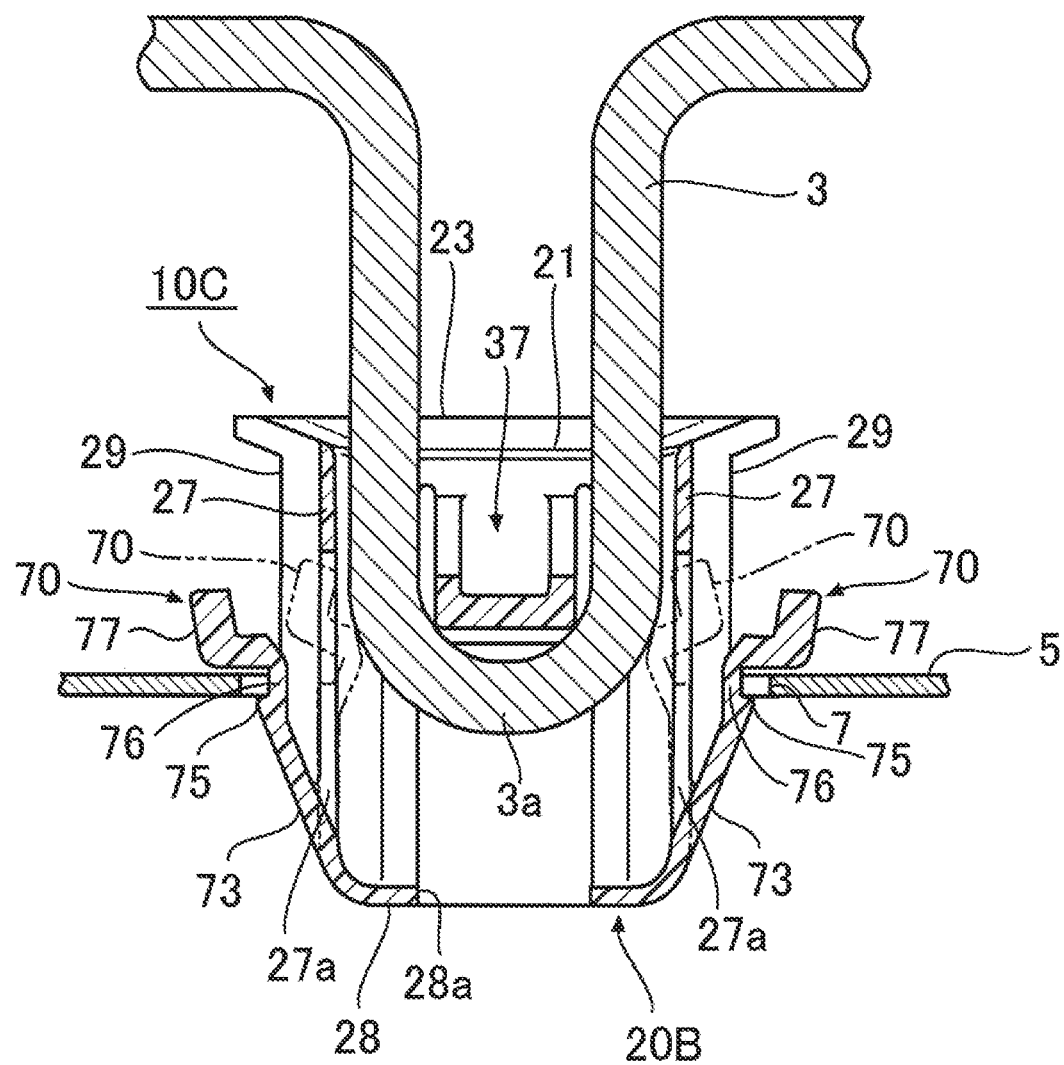
FIG. 22 is a sectional explanatory view showing still a further embodiment of a part fixture of the invention.

FIG. 22 shows a still further embodiment of a part fixture of the invention. It is noted that like reference numerals will be given to substantially like portions to those of the embodiment described above, and the description thereof will be omitted here.

A part fixture 10C (hereinafter, referred to simply as a "mounting device 10C") of this embodiment differs from the embodiment shown in FIGS. 14 to 21 in construction in which elastic engaging pieces 70 are formed.

Namely, in the mounting device 10C of this embodiment, a substantially angular U-shaped slit 27a like the substantially angular U-shaped slit 61 described in the embodiment shown in FIGS. 1 to 10 is formed on each of a pair of side wall portions 27, 27 of an accommodating portion 20B, and elastic engaging pieces 70 are allowed to be deflected via the slits 27a.

Then, when the pair of elastic engaging pieces 70, 70 are deflected towards an interior of the accommodating portion 20B, the elastic engaging pieces 70, 70 are brought into abutment with a locking portion 3 of a vehicle part 1 which is accommodated in the accommodating portion 20B, so that any further deflection of the pair of elastic engaging pieces 70, 70 is restricted.

Consequently, in this embodiment, too, the side wall portions 27, 27 of the accommodating portion 20B are allowed to have a single wall (one wall) construction, thereby making it possible to make the mounting device 10C compact in size.

It should be noted that the invention is not limited to the embodiments described heretofore. Thus, various modifications can be made to those embodiments, and the resulting embodiments are included in the scope of the invention.

BRIEF DESCRIPTION OF REFERENCE NUMERALS

1 Vehicle part
3 Locking portion

3a Bent portion
5 Mount portion
7 Mounting hole
9 Tool
9a Distal end portion
10, 10A, 10B, 10C Part fixture (Mounting device)
20, 20B Accommodating portion
21 Opening portion
23 Guide portion
25 Flange portion
26 Wall portion
27 Side wall portion
29 Rib
29a Tapered portion
30 Inner frame-shaped portion
31 Wall portion
31, 32 Wall portion
33 Inner wall portion
37, 37A Engaging piece
39, 39A Locking claw
45 Tool passage hole
47 Groove portion
50 Outer frame-shaped portion
51 Outer wall portion
53 Wall portion
60 Elastic engaging piece
65 Engaging claw
69 Gripping surface
70 Elastic engaging piece
75 Engaging claw
77 Operation knob

The invention claimed is:

1. A part fixture which is locked on a locking portion of a vehicle body and which is inserted into a mounting hole on a mount portion provided on a vehicle body to be fixed in place therein to thereby mount the vehicle part on the mount portion, comprising:
an accommodating portion which is formed into the shape of a frame which has an opening portion through which the locking portion can be inserted and has wall portions which are disposed so as to face each other and at least a pair of side wall portions which are disposed so as to intersect with a direction in which the wall portions are disposed to face each other, which accommodates the locking portion of the vehicle part and which is inserted into the mounting hole;
a locking piece which is provided on the wall portion of the accommodating portion so as to extend therefrom and which locks on the locking portion which is accommodated in the accommodating portion;
a pair of flange portions which, are provided on the wall portion of the accommodating portion so as to extend therefrom and which are brought into engagement with a circumferential edge on a front side of the mounting hole; and
a pair of elastic engaging pieces which are provided individually so as to extend outwards from the pair of side wall portions of the accommodating portion in such a way as to be deflected,
wherein the elastic engaging pieces each have:
an engaging claw which is brought into engagement with a circumferential edge on a rear side of the mounting hole; and
an operation knob which is disposed on a front side of the mounting hole with the engaging claw left in engagement with the circumferential edge on the rear side of the mounting hole and which is configured to deflect the elastic engaging piece inwards of the accommodating portion to thereby release an engagement of the engaging claw with the circumferential edge on the rear side of the mounting hole, and
wherein when the pair of elastic engaging pieces are deflected inwards of the accommodating portion by operating the operation knob, the pair of elastic engaging pieces are brought into abutment with the side wall portions or the locking portion of the vehicle part which is accommodated in the accommodating portion so that any further deflection thereof is restricted in a state where the engagement of the engaging claw with the circumferential edge on the rear side of the mounting hole is released.

2. The part fixture according to claim 1, wherein the operation knob is disposed apart from a circumferential edge on the front side of the mounting hole with a predetermined space defined therebetween in such a state that the engaging claws of the elastic engaging pieces are in engagement with the circumferential edge on the rear side of the mounting hole.

3. The part fixture according to claim 1, wherein gripping surfaces of the operation knob which are used when the operation knobs are operated are formed into inclined surfaces which are inclined diametrically further outwards as the gripping surfaces extend further away from the engaging claws.

4. The part fixture according to claim 1, further comprising a locking releasing mechanism configured to release the engagement of the locking piece with the locking portion,
wherein the locking releasing mechanism comprises a groove portion which is formed in the wall portion of the accommodating portion on which the locking piece is provided so that a distal end portion of a tool can be locked therein.

5. The part fixture according to claim 1, wherein the pair of elastic engaging pieces are provided on the side wall portions of the accommodating portion so as to individually extend obliquely outwards from distal end sides of the side wall portions in relation to an inserting direction in which the part fixture is inserted into the mounting hole towards proximal end sides of the side wall portions in relation to the same inserting direction.

6. The part fixture according to claim 1,
wherein ribs are formed on both sides of the elastic engaging piece of each of the side wall portions of the accommodating portion, ribs each having a tapered portion which becomes narrower towards a tip thereof, and
wherein with the accommodating portion inserted into the mounting hole and the engaging claws of the pair of elastic engaging pieces left in engagement with the circumferential edge on the rear side of the mounting hole, when an eccentric load is exerted on the accommodating portion so as to deflect inwards one of the pair of elastic engaging pieces, the rib on the one of the pair of elastic engaging pieces is brought into abutment with an inner circumference of the mounting hole before the other of the pair of elastic engaging pieces is released from the engagement with the circumferential edge on the rear side of the mounting hole.

7. A part fixture which is locked on a locking portion of a vehicle body and which is inserted into a mounting hole on a mount portion provided on a vehicle body to be fixed in place therein to thereby mount the vehicle part on the mount portion, comprising:

an accommodating portion which is formed into the shape of a frame which has an opening portion through which the locking portion can be inserted and has wall portions which are disposed so as to face each other and at least a pair of side wall portions which are disposed so as to intersect with a direction in which the wall portions are disposed to face each other, which accommodates the locking portion of the vehicle part and which is inserted into the mounting hole;

a locking piece which is provided on the wall portion of the accommodating portion so as to extend therefrom and which locks on the locking portion which is accommodated in the accommodating portion; and a pair of elastic engaging pieces which are provided individually on the pair of side wall of the accommodating portion so as to extend therefrom in such a way as to be deflected, wherein the elastic engaging pieces each have:
an engaging claw which is brought into engagement with a circumferential edge on a rear side of the mounting hole; and
an operation knob which is disposed on a front side of the mounting hole with the engaging claw left in engagement with the circumferential edge on the rear side of the mounting hole and which is configured to deflect the elastic engaging piece inwards of the accommodating portion to thereby release an engagement of the engaging claw with the circumferential edge on the rear side of the mounting hole, wherein the side wall portions of the accommodating portion have a pair of outer frame-shaped portions on which the elastic engaging pieces are provided and a pair of inner wall portions which are disposed inwards of the pair of outer frame-shaped portions with a predetermined space provided therebetween, and wherein when the pair of elastic engaging pieces are deflected inwards of the accommodating portion by the operation knob, the pair of elastic engaging pieces are brought into abutment with the inner wall portions so that any further deflection thereof is restricted in a state where the engagement of the engaging claw with the circumferential edge on the rear, side of the mounting hole is released.

8. The part fixture according to claim 7, wherein the operation knob is disposed apart from a circumferential edge on the front side of the mounting hole with a predetermined space defined therebetween in such a state that the engaging claws of the elastic engaging pieces are in engagement with the circumferential edge on the rear side of the mounting hole.

9. The part fixture according to claim 7, wherein gripping surfaces of the operation knob which are used when the operation knobs are operated are formed into inclined surfaces which are inclined diametrically further outwards as the gripping surfaces extend further away from the engaging claws.

10. The part fixture according to claim 7, further comprising a locking releasing mechanism configured to release the engagement of the locking piece with the locking portion,
wherein the locking releasing mechanism comprises a groove portion which is formed in the wall portion of the accommodating portion on which the locking piece is provided so that a distal end portion of a tool can be locked therein.

11. The part fixture according to claim 7, wherein the pair of elastic engaging pieces are provided on the side wall portions of the accommodating portion so as to individually extend obliquely outwards from distal end sides of the side wall portions in relation to an inserting direction in which the part fixture is inserted into the mounting hole towards proximal end sides of the side wall portions in relation to the same inserting direction.

12. The part fixture according to claim 7,
wherein ribs are formed on both sides of the elastic engaging piece of each of the side wall portions of the accommodating portion, ribs each having a tapered portion which becomes narrower towards a tip thereof, and
wherein with the accommodating portion inserted into the mounting hole and the engaging claws of the pair of elastic engaging pieces left in engagement with the circumferential edge on the rear side of the mounting hole, when an eccentric load is exerted on the accommodating portion so as to deflect inwards one of the pair of elastic engaging pieces, the rib on the one of the pair of elastic engaging pieces is brought into abutment with an inner circumference of the mounting hole before the other of the pair of elastic engaging pieces is released from the engagement with the circumferential edge on the rear side of the mounting hole.

13. A part fixture which is locked on a locking portion of a vehicle body and which is inserted into a mounting hole on a mount portion provided on a vehicle body to be fixed in place therein to thereby mount the vehicle part on the mount portion, comprising:
an accommodating portion which is formed into the shape of a frame which has an opening portion through which the locking portion can be inserted and has wall portions which are disposed so as to face each other and at least a pair of side wall portions which are disposed so as to intersect with a direction in which the wall portions are disposed to face each other, which accommodates the locking portion of the vehicle part and which is inserted into the mounting hole;
a locking niece which is provided on the wall portion of the accommodating portion so as to extend therefrom and which locks on the locking portion which is accommodated in the accommodating portion;
a pair of elastic engaging pieces which are provided individually on the pair of side wall portions of the accommodating portion so as to extend therefrom in such a way as to be deflected; and
a locking releasing mechanism configured to release the engagement of the locking piece with the locking portion,
wherein the elastic engaging pieces each have:
an engaging claw which is brought into engagement with a circumferential edge on a rear side of the mounting hole; and
an operation knob which is disposed on a front side of the mounting hole with engaging claw left in engagement with the circumferential edge on the rear side of the mounting hole and which is configured to deflect the elastic engaging piece inwards of the accommodating portion to thereby release an engagement of the engaging claw with the circumferential edge on the rear side of the mounting hole, and
wherein the locking releasing mechanism is made up of a tool passage hole which is formed in the wall portion of the accommodating portion which faces the wall portion thereof on which the locking piece is provided so that a distal end portion of a tool can be passed therethrough.

14. The part fixture according to claim 13, wherein the operation knob is disposed apart from a circumferential edge on the front side of the mounting hole with a predetermined space defined therebetween in such a state that the engaging claws of the elastic engaging pieces are in engagement with the circumferential edge on the rear side of the mounting hole.

15. The part fixture according to claim 13, wherein gripping surfaces of the operation knob which are used when the operation knobs are operated are formed into inclined surfaces which are inclined diametrically further outwards as the gripping surfaces extend further away from the engaging claws.

16. The part fixture according to claim 13, further comprising a locking releasing mechanism configured to release the engagement of the locking piece with the locking portion,
wherein the locking releasing mechanism comprises a groove portion which is formed in the wall portion of the accommodating portion on which the locking piece is provided so that a distal end portion of a tool can be locked therein.

17. The part fixture according to claim 13, wherein the pair of elastic engaging pieces are provided on the side wall portions of the accommodating portion so as to individually extend obliquely outwards from distal end sides of the side wall portions in relation to an inserting direction in which the part fixture is inserted into the mounting hole towards proximal end sides of the side wall portions in relation to the same inserting direction.

18. The part fixture according to claim 13,
wherein ribs are formed on both sides of the elastic engaging piece of each of the side wall portions of the accommodating portion, the ribs each having a tapered portion which becomes narrower towards a tip thereof, and
wherein with the accommodating portion inserted into the mounting hole and the engaging claws of the pair of elastic engaging pieces left in engagement with the circumferential edge on the rear side of the mounting hole, when an eccentric load is exerted on the accommodating portion so as to deflect inwards one of the pair of elastic engaging pieces, the rib on the one of the pair of elastic engaging pieces is brought into abutment with an inner circumference of the mounting hole before the other of the pair of elastic engaging pieces is released from the engagement with the circumferential edge on the rear side of the mounting hole.

* * * * *